US011032673B2

(12) United States Patent
Fujishiro et al.

(10) Patent No.: US 11,032,673 B2
(45) Date of Patent: Jun. 8, 2021

(54) RADIO TERMINAL AND BASE STATION

(71) Applicant: KYOCERA Corporation, Kyoto (JP)

(72) Inventors: Masato Fujishiro, Yokohama (JP);
Henry Chang, San Diego, CA (US);
Hiroyuki Urabayashi, Yokohama (JP)

(73) Assignee: KYOCERA Corporation, Kyoto (JP)

(*) Notice: Subject to any disclaimer, the term of this patent is extended or adjusted under 35 U.S.C. 154(b) by 312 days.

(21) Appl. No.: 16/328,594

(22) PCT Filed: Aug. 23, 2017

(86) PCT No.: PCT/JP2017/030121
§ 371 (c)(1),
(2) Date: Feb. 26, 2019

(87) PCT Pub. No.: WO2018/043243
PCT Pub. Date: Mar. 8, 2018

(65) Prior Publication Data
US 2019/0191279 A1 Jun. 20, 2019

Related U.S. Application Data

(60) Provisional application No. 62/381,140, filed on Aug. 30, 2016.

(51) Int. Cl.
*H04W 4/06* (2009.01)
*H04W 72/00* (2009.01)
(Continued)

(52) U.S. Cl.
CPC ............ *H04W 4/06* (2013.01); *H04W 72/005* (2013.01); *H04W 72/0446* (2013.01);
(Continued)

(58) Field of Classification Search
CPC ....... H04W 4/06; H04W 4/70; H04W 72/005; H04W 72/0446; H04W 8/183; H04W 8/26; H04W 36/0033; H04W 48/12
(Continued)

(56) References Cited

U.S. PATENT DOCUMENTS

2007/0242636 A1* 10/2007 Kashima ........... H04W 72/1289
370/329
2008/0043658 A1* 2/2008 Worrall ............... H04W 72/005
370/312
(Continued)

FOREIGN PATENT DOCUMENTS

JP 2010-502065 A 1/2010
JP 2012-525083 A 10/2010
(Continued)

*Primary Examiner* — Chi Tang P Cheng
(74) *Attorney, Agent, or Firm* — Studebaker & Brackett PC

(57) ABSTRACT

A radio terminal includes a receiver configured to receive a counting request, the counting request requesting transmission of a counting response from a plurality of radio terminals that are receiving a specific MBMS service or interested in the reception of the specific MBMS service, and a common resource setting from a network, the common resource setting indicating a common resource pool to be commonly used by the plurality of radio terminals for the transmission of the counting response; a controller configured to determine whether or not the radio terminal is receiving the specific MBMS service or interested in the reception thereof in response to receiving the counting request; and a transmitter configured to transmit the counting response to the network by using a radio resource included in the common resource pool in response to the determination that the radio terminal is receiving the specific MBMS service or interested in the reception thereof.

11 Claims, 14 Drawing Sheets

(51) Int. Cl.
  *H04W 72/04* (2009.01)
  *H04W 8/18* (2009.01)
  *H04W 48/12* (2009.01)
  *H04W 4/70* (2018.01)
  *H04W 36/00* (2009.01)
  *H04W 8/26* (2009.01)

(52) U.S. Cl.
  CPC .............. *H04W 4/70* (2018.02); *H04W 8/183* (2013.01); *H04W 8/26* (2013.01); *H04W 36/0033* (2013.01); *H04W 48/12* (2013.01)

(58) Field of Classification Search
  USPC ........................................................ 370/329
  See application file for complete search history.

(56) References Cited

U.S. PATENT DOCUMENTS

| | | |
|---|---|---|
| 2010/0296467 A1 | 11/2010 | Pelletier et al. |
| 2011/0274040 A1 | 11/2011 | Pani et al. |
| 2012/0127930 A1* | 5/2012 | Nguyen .............. H04W 74/002 370/329 |
| 2012/0202493 A1* | 8/2012 | Wang .................... H04W 60/00 455/435.1 |
| 2013/0003678 A1* | 1/2013 | Quan .................... H04W 72/04 370/329 |
| 2013/0024489 A1* | 1/2013 | Prihed .................... G06F 7/584 708/235 |
| 2017/0013422 A1 | 1/2017 | Saiwai et al. |
| 2019/0053285 A1* | 2/2019 | Martin .............. H04W 74/0833 |

FOREIGN PATENT DOCUMENTS

| | | |
|---|---|---|
| JP | 2013-520103 A | 5/2013 |
| JP | 2014-510449 A | 4/2014 |
| WO | 2015/125901 A1 | 8/2015 |

* cited by examiner

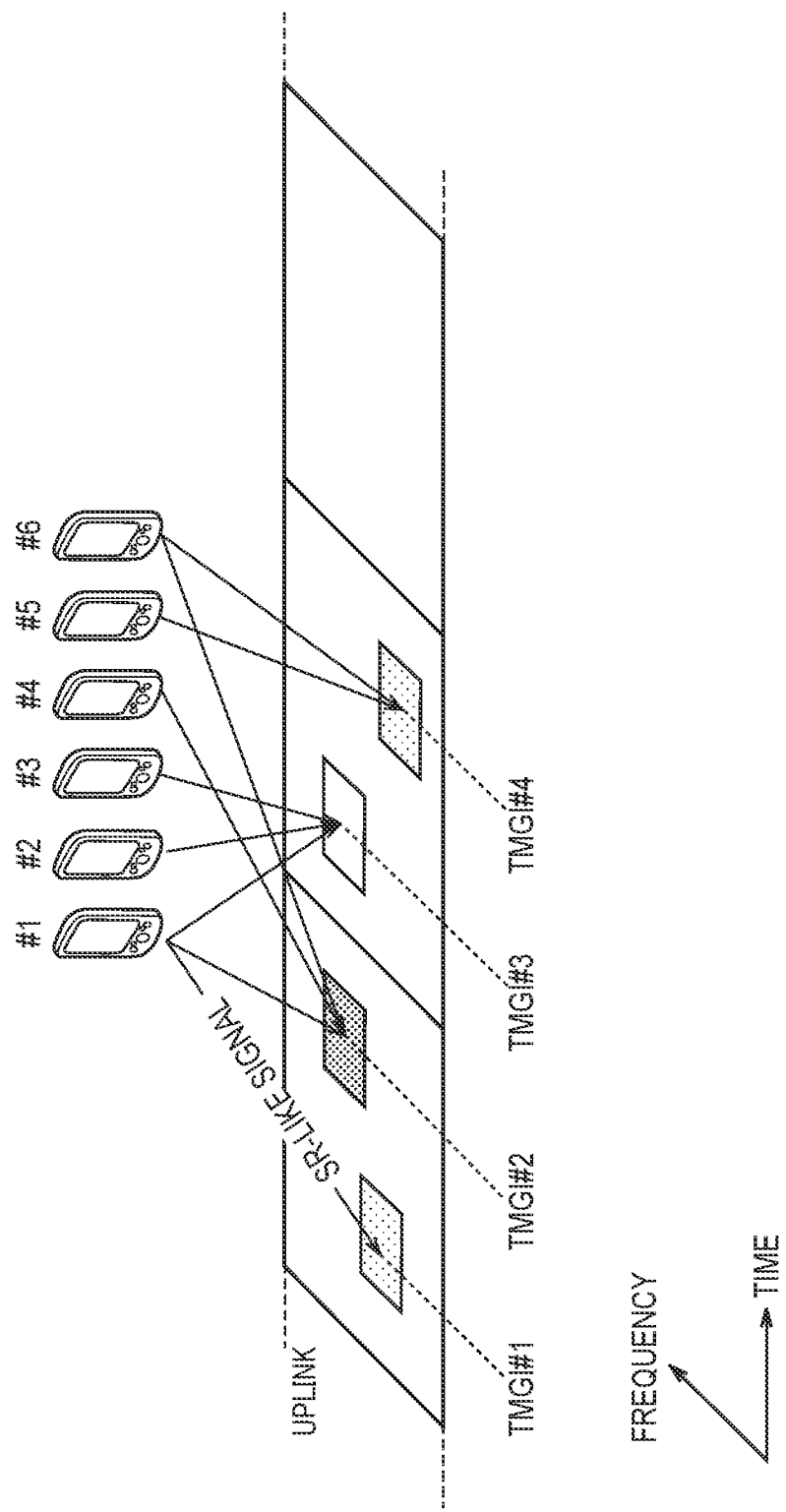

US 11,032,673 B2

RADIO TERMINAL AND BASE STATION

TECHNICAL FIELD

The present disclosure relates to a radio terminal and a base station for a mobile communication system.

BACKGROUND ART

In 3GPP (Third Generation Partnership Project), which is a project aiming to standardize a mobile communication system, the specifications of MBMS (Multimedia Broadcast Multicast Service) have been laid out to provide a radio terminal with a multicast/broadcast service. As radio transmission schemes for MBMS, there are two schemes: MBSFN (Multicast Broadcast Single Frequency Network) transmission and SC-PTM (Single Cell Point-To-Multipoint) transmission. Since MBMS provides the same service(s) to a plurality of radio terminals using the same radio resource, the utilization efficiency of radio resources can be enhanced.

SUMMARY OF THE INVENTION

A radio terminal according to a first aspect includes a receiver configured to receive a counting request, the counting request requesting transmission of a counting response from a plurality of radio terminals that are receiving a specific MBMS service or interested in the reception of the specific MBMS service, and a common resource setting from a network, the common resource setting indicating a common resource pool to be commonly used by the plurality of radio terminals for the transmission of the counting response; a controller configured to determine whether or not the radio terminal is receiving the specific MBMS service or interested in the reception thereof in response to receiving the counting request; and a transmitter configured to transmit the counting response to the network by using a radio resource included in the common resource pool in response to the determination that the radio terminal is receiving the specific MBMS service or interested in the reception thereof.

A base station according to a second aspect includes a receiver configured to receive from a network a common resource setting indicating common resources to be commonly used for transmission of an uplink signal by a plurality of radio terminals; a controller configured to acquire a unique identifier of the radio terminal and determine a radio resource to be used by the radio terminal for the transmission of the uplink signal from among the common resources, based on the unique identifier; and a transmitter configured to transmit the uplink signal to the network by using the determined radio resource.

A radio terminal according to a third aspect includes a receiver configured to receive from a network a common resource setting indicating common resources to be commonly used for transmission of an uplink signal by a plurality of radio terminals; a controller configured to acquire a unique identifier of the radio terminal and determine a radio resource to be used by the radio terminal for the transmission of the uplink signal from among the common resources, based on the unique identifier; and a transmitter configured to transmit the uplink signal to the network by using the determined radio resource.

BRIEF DESCRIPTION OF THE DRAWINGS

FIG. 15 is a diagram illustrating a correspondence relationship between a service identifier (TMGI) and a common resource pool according to the third embodiment.

DESCRIPTION OF THE EMBODIMENT (Mobile Communication System)

Figure 1:
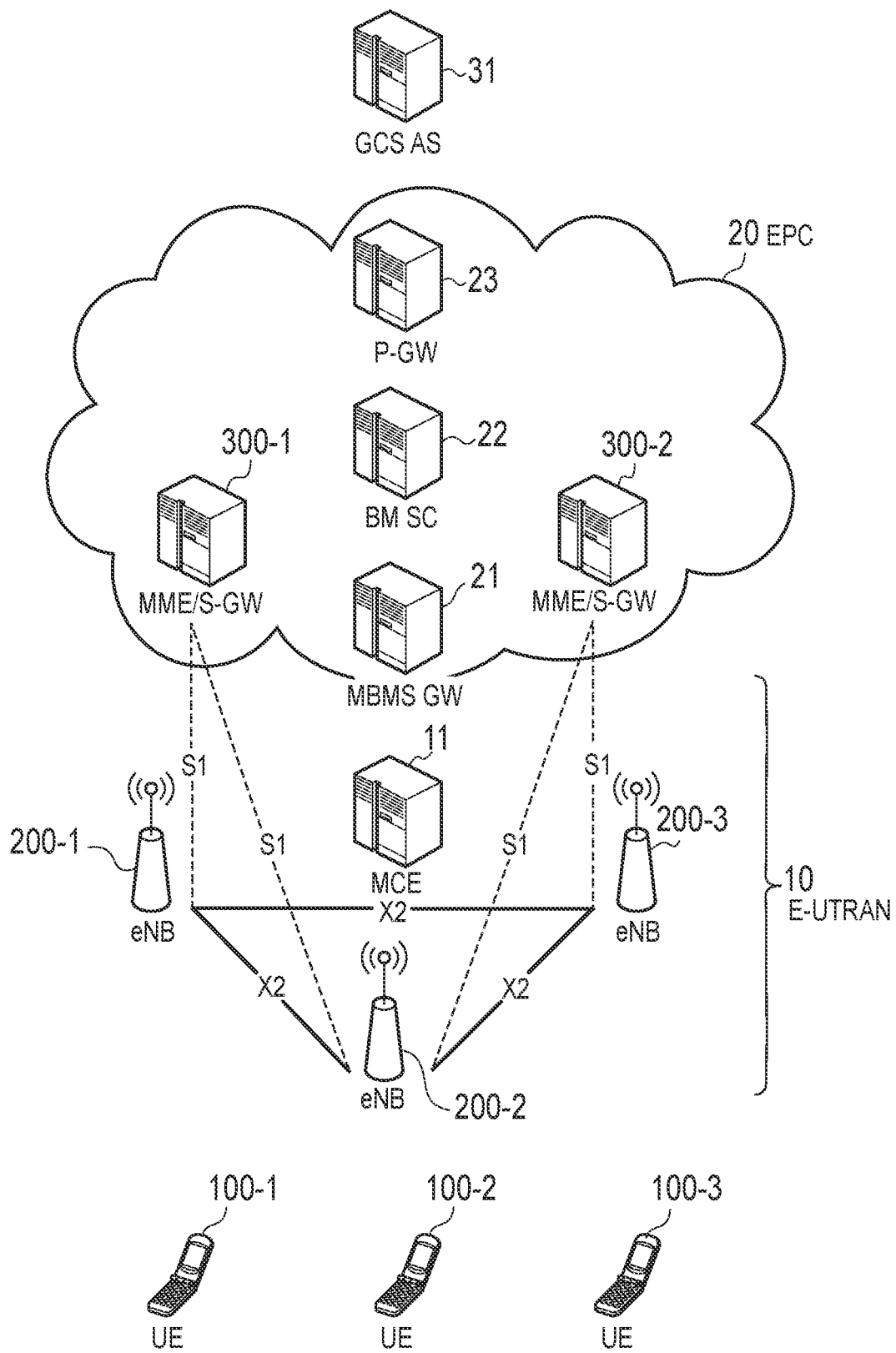
FIG. 1 is a diagram illustrating a configuration of an LTE system according to an embodiment.
Figure 2:
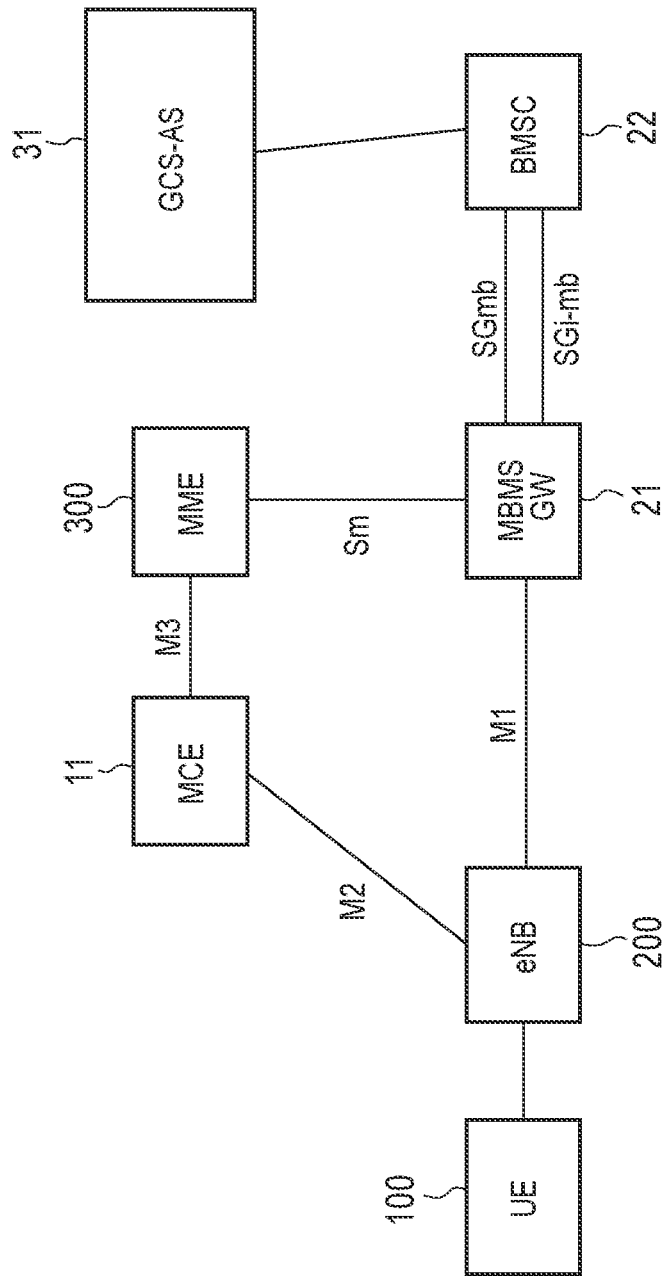
FIG. 2 is a diagram illustrating a network configuration for MBMS according to the embodiment.

Configuration of a mobile communication system according to an embodiment will be described. The mobile communication system according to the embodiment is an LTE (Long Term Evolution) system whose specification is formulated by 3GPP. FIG. 1 is a diagram illustrating a configuration of the LTE system according to the embodiment. FIG. 2 is a diagram illustrating a network configuration for MBMS.

As illustrated in FIG. 1, the LTE system includes a radio terminal (UE: User Equipment) 100, a radio access network (E-UTRAN: Evolved-UMTS Terrestrial Radio Access Network) 10, and a core network (Evolved Packet Core) 20. The E-UTRAN 10 and the EPC 20 constitute the network of the LTE system.

The UE 100 is a mobile communication device. The UE 100 performs radio communication with the eNB 200 that manages a cell (serving cell) in which the UE 100 exists.

The E-UTRAN 10 includes base stations (evolved Node-Bs) 200. The eNB 200s are connected to each other via an X2 interface. The eNB 200 manages one or a plurality of cells. The eNB 200 performs radio communication with the UE 100 that establishes a connection with a cell managed by the eNB 200. The eNB 200 has a radio resource management (RRM) function, a routing function of user data (hereinafter referred to simply as "data"), a measurement control function for mobility control/scheduling, and the like. "Cell" is used as a term indicating the minimum unit of radio communication area. "Cell" is also used as a term indicating a function or resource for performing radio communication with the UE 100.

The EPC 20 includes a mobility management entity (MME) and a serving gateway (S-GW) 300. The MME performs various mobility control and the like for the UE 100. The S-GW performs data transfer control. The MME/S-GW 300 is connected to the eNB 200 via an S1 interface.

Network entities for MBMS will be described. The E-UTRAN 10 includes an MCE (Multi-Cell/Multicast Coordinating Entity) 11. The MCE 11 is connected to the eNB 200 via a M2 interface and is connected to the MME 300 via a M3 interface (See FIG. 2). The MCE 11 performs MBSFN radio resource management/allocation and the like. Specifically, the MCE 11 performs scheduling of MBSFN transmission. On the other hand, scheduling of the SC-PTM transmission is performed by the eNB 200.

The EPC 20 includes an MBMS GW (MBMS Gateway) 21. The MBMS GW 21 is connected to the eNB 200 via a M1 interface, connected to the MME 300 via a Sm interface, and connected to a BM-SC 22 via a SG-mb interface and a SGi-mb interface (See FIG. 2). The MBMS GW 21 performs IP multicast data transmission and session control to the eNB 200.

The EPC 20 also includes a BM-SC (Broadcast Multicast Service Center) 22. The BM-SC 22 is connected to the MBMS GW 21 via the SG-mb and SGi-mb interfaces, and is connected to the P-GW 23 via the SGi interface (See FIG. 2). The BM-SC 22 mainly manages and allocates TMGI (Temporary Mobile Group Identity).

A GCS AS (Group Communication Service Application Server) 31 is provided in a network (i.e., the Internet) outside the EPC 20. The GCS AS 31 is an application server for group communication. The GCS AS is connected to a BM-SC 22 via a MB2-U interface and a MB2-C interface, and is connected to a P-GW 23 via a SGi interface. The GCS AS 31 performs group management and data distribution and the like in group communication.

Figure 3:
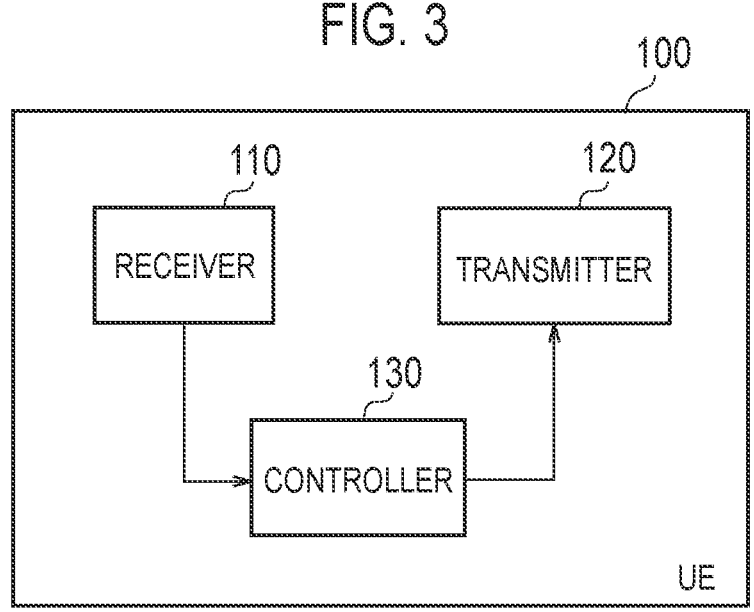
FIG. 3 is a diagram illustrating a configuration of a UE (radio terminal) according to the embodiment.

FIG. 3 is a diagram illustrating a configuration of the UE (radio terminal) according to the embodiment. As illustrated in FIG. 2, the UE 100 includes a receiver 110, a transmitter 120 and a controller 130.

The receiver 110 performs various types of reception under control of the controller 130. The receiver 110 includes antennas and a receiving machine. The receiving machine converts the radio signal received by the antennas into a baseband signal (reception signal) and outputs it to the controller 130.

The transmitter 120 performs various transmissions under control of the controller 130. The transmitter 120 includes antennas and a transmitting machine. The transmitting machine converts a baseband signal (transmission signal) output from the controller 130 into a radio signal and transmits it from the antennas.

The controller 130 performs various controls in the UE 100. The controller 130 includes a processor and a memory. The memory stores programs executed by the processor and information used for processing by the processor. The processor includes a baseband processor and a CPU (Central Processing Unit). The baseband processor modulates and demodulates the baseband signal, performs encoding and decoding, and the like. The CPU executes various processes by executing programs stored in the memory. The processor may include a codec for encoding/decoding audio/video signals. The processor executes various processes to be described later.

Figure 4:
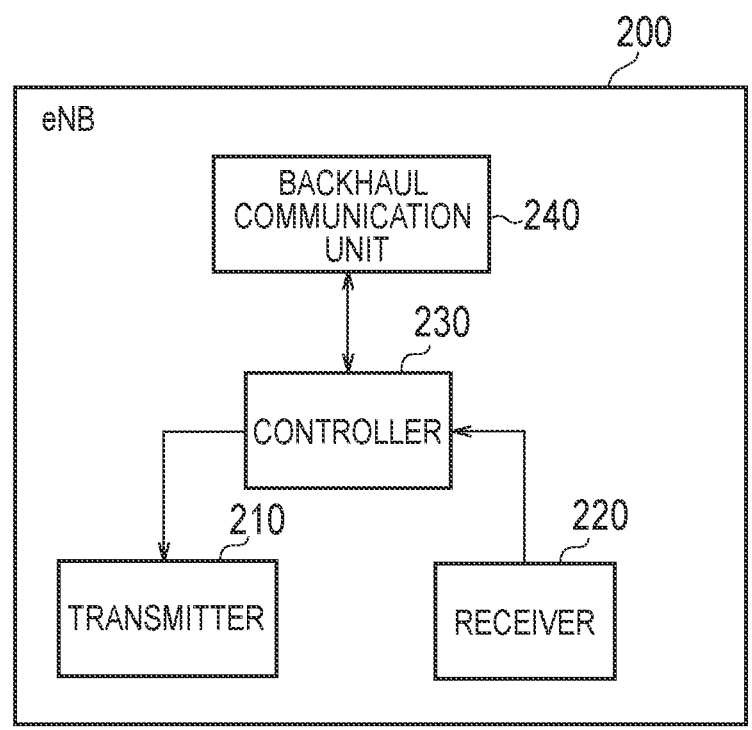
FIG. 4 is a diagram illustrating a configuration of an eNB (base station) according to the embodiment.

FIG. 4 is a diagram illustrating a configuration of the eNB (base station) 200 according to the embodiment. As illustrated in FIG. 4, the eNB 200 includes a transmitter 210, a receiver 220, a controller 230, and a backhaul communication unit 240.

The transmitter 210 performs various transmissions under control of the controller 230. The transmitter 210 includes antennas and a transmitting machine. The transmitting machine converts a baseband signal (transmission signal) outputted by the controller 230 into a radio signal and transmits it from the antennas.

The receiver 220 performs various types of reception under control of the controller 230. The receiver 220 includes antennas and a receiving machine. The receiving machine converts the radio signal received by the antennas into a baseband signal (received signal) and outputs it to the controller 230.

The controller 230 performs various controls in the eNB 200. The controller 230 includes a processor and a memory. The memory stores programs executed by the processor and information used for processing by the processor. The processor includes a baseband processor and a CPU. The baseband processor modulates and demodulates the baseband signal, performs encoding and decoding, and the like. The CPU executes various processes by executing programs stored in the memory. The processor executes processes to be described later.

The backhaul communication unit 240 is connected to adjacent eNBs via an X2 interface. The backhaul communication unit 240 is connected to the MME/S-GW 300 via an S1 interface. The backhaul communication unit 240 is used for communication performed on the X2 interface, communication performed on the S1 interface, and the like.

Figure 5:
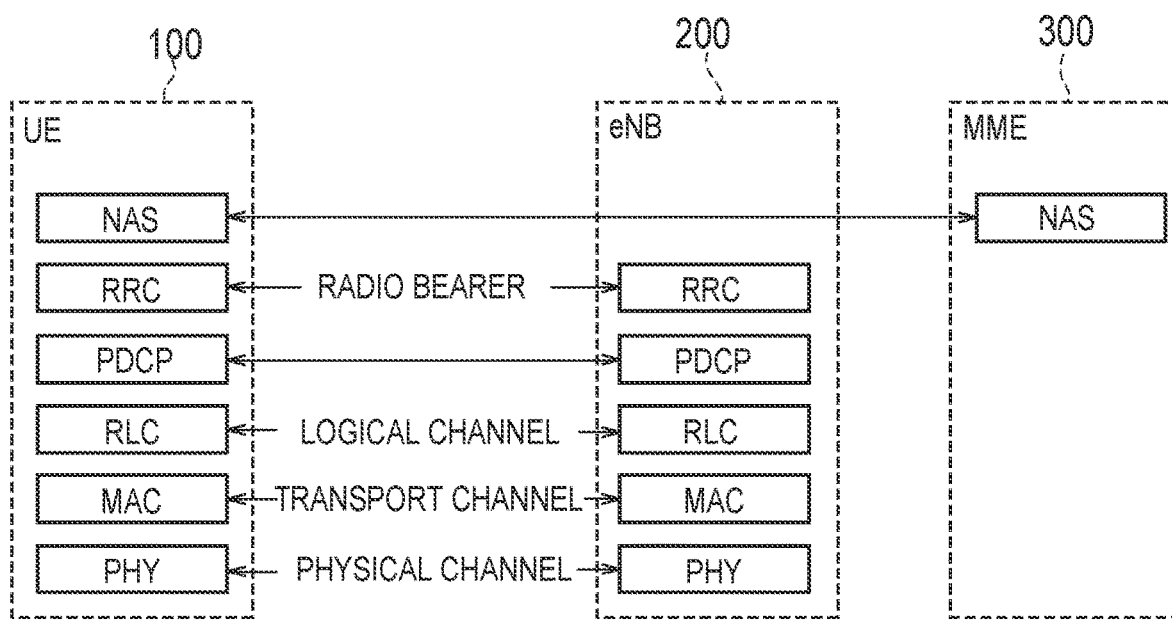
FIG. 5 is a diagram illustrating a protocol stack of a radio interface in the LTE system according to the embodiment.

FIG. 5 is a diagram illustrating a configuration of a protocol stack of a radio interface. As illustrated in FIG. 5, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The PHY layer carries out coding/decoding, modulation/demodulation, antenna mapping/demapping, resource mapping/demapping. Between the PHY layer of the UE 100 and the PHY layer of the eNB 200, data and control signals are transmitted via the physical channel.

The MAC layer performs priority control of data, retransmission processing by hybrid ARQ (HARQ), and the like. Between the MAC layer of the UE 100 and the MAC layer of the eNB 200, data and control signals are transmitted via a transport channel. The MAC layer of the eNB 200 includes a scheduler. The scheduler determines the uplink and downlink transport format (transport block size, modulation and coding scheme (MCS)) and the allocated resource block to the UE 100.

The RLC layer uses the functions of the MAC layer and the PHY layer to transmit data to the RLC layer on the receiving side. Between the RLC layer of the UE 100 and the RLC layer of the eNB 200, data and control information are transmitted via logical channels.

The PDCP layer carries out header compression/decompression, encryption/decryption.

The RRC layer is defined only in the control plane handling the control signals. Between the RRC layer of the UE 100 and the RRC layer of the eNB 200, messages (RRC messages) for various settings are transmitted. The RRC layer controls logical channels, transport channels, and physical channels in response to establishment, reestablishment and release of radio bearers. If there is a connection (RRC connection) between the RRC of the UE 100 and the RRC of the eNB 200, the UE 100 is in the RRC connected mode. Otherwise, the UE 100 is in the RRC idle mode.

NAS (Non-Access Stratum) layer located above the RRC layer performs session management, mobility management, and the like.

Figure 6A:
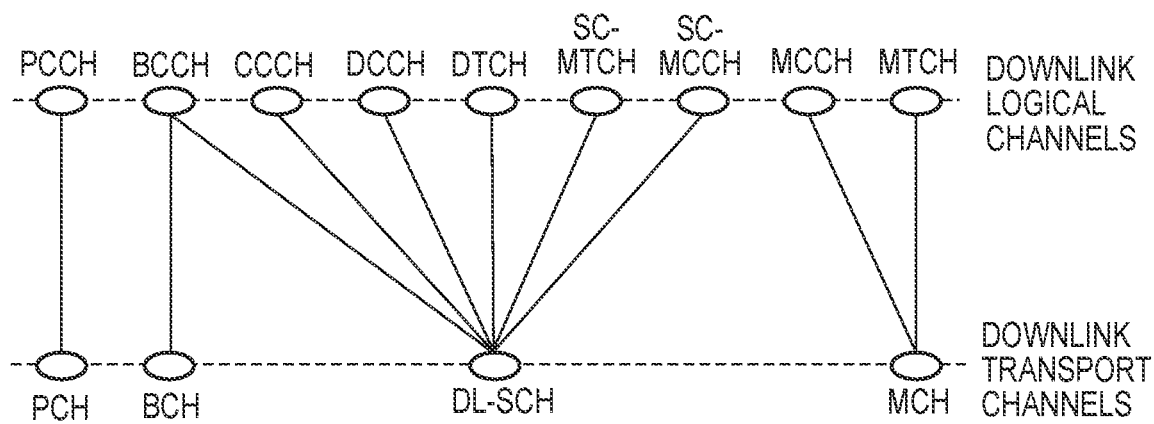
FIG. 6A is a diagram illustrating a configuration of a downlink channel of the LTE system according to the embodiment, and is a diagram illustrating mapping between a logical channel and a transport channel.

FIG. 6 is a diagram illustrating a channel configuration of downlink of the LTE system. FIG. 6A illustrates mapping between a logical channel (Downlink Logical Channel) and a transport channel (Downlink Transport Channel).

As illustrated in FIG. 6A, a PCCH (Paging Control Channel) is a logical channel for notifying paging information and system information change. The PCCH is mapped to a PCH (Paging Channel) that is a transport channel.

A BCCH (Broadcast Control Channel) is a logical channel for system information. The BCCH is mapped to a BCH (Broadcast Control Channel) and a DL-SCH (Downlink Shared Channel), both of which are transport channels.

A CCCH (Common Control Channel) is a logical channel for transmission control information between the UE 100 and the eNB 200. The CCCH is used if the UE 100 does not have an RRC connection with the network. The CCCH is mapped to the DL-SCH.

A DCCH (Dedicated Control Channel) is a logical channel for transmitting individual control information between the UE 100 and the network. The DCCH is used if the UE 100 has an RRC connection. The DCCH is mapped to the DL-SCH.

A DTCH (Dedicated Traffic Channel) is an individual logical channel for data transmission. The DTCH is mapped to the DL-SCH.

An SC-MTCH (Single Cell Multicast Traffic Channel) is a logical channel for SC-PTM transmission. The SC-MTCH is a point-to-multipoint downlink channel for transmitting data from the network to the UE 100 by using the SC-PTM transmission.

An SC-MCCH (Single Cell Multicast Control Channel) is a logical channel for SC-PTM transmission. The SC-MCCH is a point-to-multipoint downlink channel for transmitting MBMS control information for one or more SC-MTCHs from the network to the UE 100. The SC-MCCH is used for the UE 100 that is to receive MBMS using SC-PTM or that is interested in the reception. Further, there is only one SC-MCCH in one cell. "Being interested in reception of MBMS" means, for example, a state of setting in which an MBMS service is not yet received but the MBMS service is to be received from an upper layer (for example, application layer).

An MCCH (Multicast Control Channel) is a logical channel for MBSFN transmission. The MCCH is used for transmitting MBMS control information for MTCH from the network to the UE 100. The MCCH is mapped to an MCH (Multicast Channel) that is a transport channel.

An MTCH (Multicast Traffic Channel) is a logical channel for MBSFN transmission. The MTCH is mapped to the MCH.

Figure 6B:
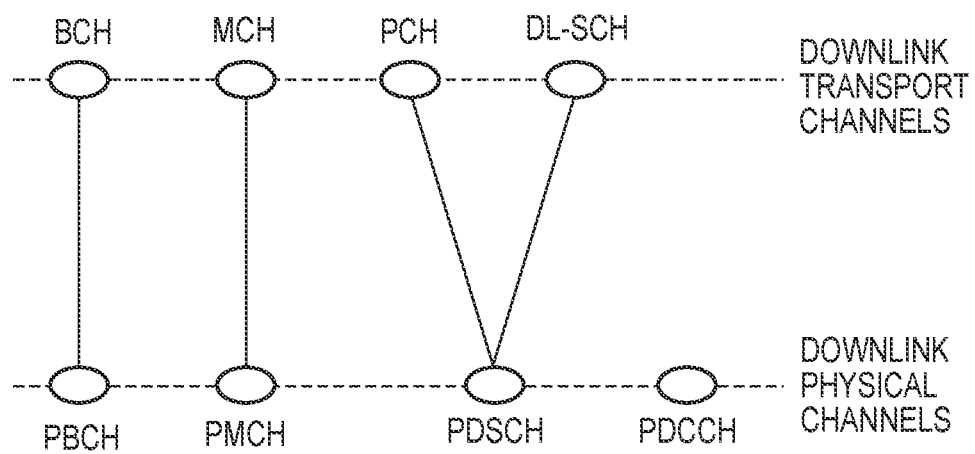
FIG. 6B is a diagram illustrating a configuration of a downlink channel of the LTE system according to the embodiment, and is a diagram illustrating a mapping between a transport channel and a physical channel.

FIG. 6B illustrates mapping between a transport channel (Downlink Transport Channel) and a physical channel (Downlink Physical Channel).

As illustrated in FIG. 6B, the BCH is mapped to a PBCH (Physical Broadcast channel).

The MCH is mapped to a PMCH (Physical Multicast Channel). The MCH supports MBSFN transmission by a plurality of cells.

The PCH and the DL-SCH are mapped to a PDSCH (Physical Downlink Shared Channel). The DL-SCH supports HARQ, link adaptation, and dynamic resource allocation.

A PDCCH carries resource allocation information of the PDSCH (DL-SCH, PCH), HARQ information on the DL-SCH, and the like. Further, the PDCCH carries an uplink scheduling grant.

Figure 7:
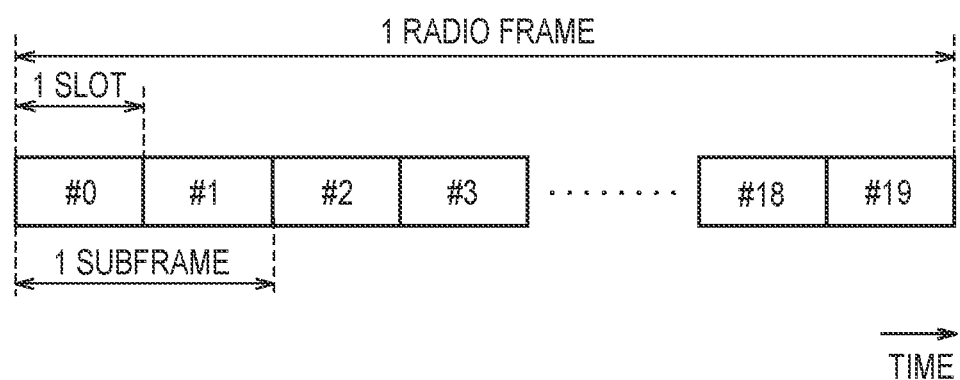
FIG. 7 is a diagram illustrating a configuration of a radio frame of the LTE system according to the embodiment.

FIG. 7 is a diagram illustrating a configuration of a radio frame of the LTE system. In the LTE system, OFDMA (Orthogonal Frequency Division Multiple Access) is applied to a downlink, and SC-FDMA (Single Carrier Frequency Division Multiple Access) is applied to an uplink.

As illustrated in FIG. 7, the radio frame is composed of ten subframes arranged in the time direction. Each subframe is composed of two slots arranged in the time direction. Each subframe has a length of 1 ms and each slot has a length of 0.5 ms. Each subframe includes a plurality of resource blocks (RBs) in the frequency direction, and a plurality of symbols in the time direction. Each resource block includes a plurality of subcarriers in the frequency direction. One resource element (RE) is configured of one symbol and one subcarrier. Further, of the radio resources (time-frequency resources) allocated to the UE 100, a frequency resource can be identified by a resource block, and a time resource can be identified by a subframe (or a slot).

In the downlink, a section including several symbols at the head of each subframe is a region used as the PDCCH for mainly transmitting a downlink control signal. The remaining portion of each subframe is a region available as the PDSCH for mainly transmitting downlink data. Further, in the downlink, an MBSFN subframe that is a subframe for MBSFN transmission may be set.

In the uplink, both ends in the frequency direction of each subframe are regions used as the PUCCH for mainly transmitting a uplink control signal. The remaining portion of each subframe is a region available as the PUSCH for mainly transmitting uplink data.

(Specific State)

A specific state will be described. The specific state is a state in which signaling for the UE 100 is suppressed while an S1 connection for the UE 100 is maintained. The S1 connection may be referred to as an S1 bearer. The S1 connection is a connection established between the eNB 200 and the EPC 20 on the S1 interface. The S1 interface includes an S1-U interface for user plane and an S1-MME interface for control plane. The S1 connection may include an S1-U connection established between the eNB 200 and an S-GW 300U on the S1-U interface, and an S1-MME connection established between the eNB 200 and an MME 300C on an S1-C interface.

The specific state may be one state of the RRC connected mode or one state of the RRC idle mode. Alternatively, the specific state may be the RRC idle mode or an RRC state different from the RRC idle mode. According to the specific state, the signaling is reduced as compared with the general RRC connected mode. Further, according to the specific state, the UE 100 can start data communication quickly as compared with the general RRC idle mode. Hereinafter, the specific state is referred to as "Light Connected state (Light Connected substate)".

Figure 8:
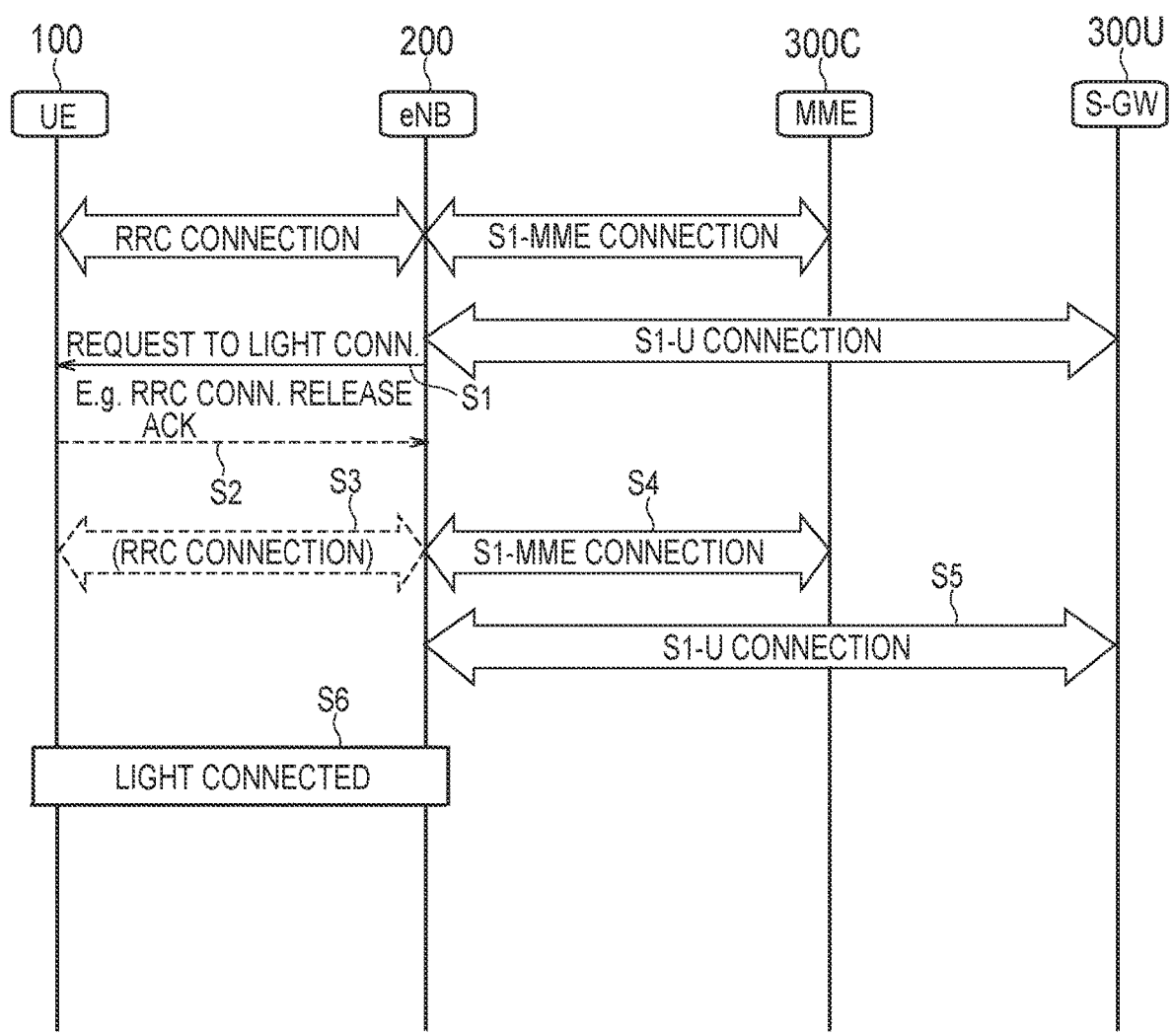
FIG. 8 is a diagram illustrating an operation related to transition to a Light Connected state according to the embodiment.

FIG. 8 is a diagram illustrating an operation concerning transition to the Light Connected state (specific state). In the initial state in FIG. 8, the UE 100 is in the RRC connected mode, and an RRC connection has been established between the UE 100 and the eNB 200. In addition, an S1-MME connection has been established between the eNB 200 and the MME 300C. The S1-U connection has been established between the eNB 200 and the S-GW 300U. The UE 100 performs data communication with the eNB 200.

As illustrated in FIG. 8, in step S1, the eNB 200 transmits, to the UE 100, a transition instruction (Request to Light Conn.) instructing a transition to the Light Connected state.

In step S2, the UE 100 transmits an acknowledgment (Ack) message to the eNB 200 in response to receiving the transition instruction. However, step S2 is not essential and thus may be omitted.

In step S3, the UE 100 and the eNB 200 maintain or release the RRC connection.

In step S4, the eNB 200 and the MME 300C maintain the S1-MME connection. In step S5, the eNB 200 and the S-GW 300U maintain the S1-U connection. In step S6, the UE 100 makes a transition to the Light Connected state and suspends data communication with the eNB 200.

The eNB 200 maintains context information (UE context) of the UE 100 that has made the transition to the Light Connected state without discarding the context information. The UE context includes information related to various types of settings and capabilities etc. for the UE 100. The various types of settings include a setting of AS (Access Stratum).

The UE 100 in the Light Connected state can resume data communication with the eNB 200 with less signaling by utilizing the maintained S1 connection and UE context.

The UE 100 that has made the transition to the Light Connected state in the cell of a first eNB 200 may move from the cell of the first eNB 200 to the cell of a second eNB 200. When the UE 100 resumes the data communication in the cell of the second eNB 200, the second eNB 200 may acquire the UE context of the UE 100 on the X2 interface from the first eNB 200, and use the acquired UE context for the data communication with the UE 100.

To the UE 100 in the Light Connected state, RAN-based paging may be applied. The RAN-based paging performs paging in units of a predetermined paging area where paging is controlled by the E-UTRAN 10 (eNB 200). The predetermined paging area is an area narrower than the tracking area. Introduction of the predetermined paging area makes it possible to reduce the number of cells for which paging for one UE 100 is performed, so that signaling can be reduced. Hereinafter, such a predetermined paging area is referred to as "RAN paging area".

As an example, the RAN paging area is composed of a cell of a specific eNB 200 that maintains the S1 connection of the UE 100 in the Light Connected state and a cell of an eNB 200 near the specific eNB 200. The nearby eNB 200 may be an eNB 200 having the X2 interface with the specific eNB 200. When receiving data or NAS signaling for the UE 100 in the Light Connected state from the MME/S-GW 300, the specific eNB 200 determines to perform the RAN-based paging and performs paging for the UE 100 together with the nearby eNB 200. The paging may be performed by transmitting an RRC paging message, or may be performed by transmitting data for the UE 100 as a paging message.

First Embodiment

A first embodiment will be described. In the first embodiment, a scenario is assumed in which the UE 100 in the RRC idle mode receives an MBMS service from the network. Alternatively, a scenario may be assumed in which the UE 100 in the Light Connected state receives an MBMS service from the network.

In a typical LTE system, the network can count the number of UEs 100 in the RRC connected mode that are receiving a specific MBMS service or that are interested in the reception, by using an MBMS counting procedure. Specifically, the eNB 200 transmits a counting request to the UE 100 in the RRC connected mode. The counting request includes a list of service identifiers (TMGI) of the MBMS service to be counted. When receiving the counting request, the UE 100 determines whether the UE 100 is receiving the MBMS service to be counted or is interested in the reception. The UE 100 transmits a counting response to the eNB 200 in response to the UE 100 being receiving the MBMS service or interested in the reception. The counting response includes information indicating the MBMS service that the UE 100 is receiving or interested in the reception, among MBMS services to be counted. The eNB 200 counts the number of UEs 100 that are receiving or interested in the MBMS service to be counted and reports the count result to the MCE 11.

A typical counting response is transmitted from the UE 100 to the eNB 200 by using a normal uplink transmission procedure. Specifically, the UE 100 transmits a scheduling request (SR) and/or a buffer status report (BSR) to the eNB 200. The eNB 200 schedules an uplink radio resource (for example, a PUSCH resource) to the UE 100 based on the SR and/or the BSR, and transmits the scheduling information to the UE 100. The UE 100 transmits the counting response to the eNB 200 by using the scheduled uplink radio resource.

Such a typical MBMS counting procedure cannot be applied to the UE 100 in the RRC idle mode or the Light Connected state. Accordingly, the network cannot grasp the reception status of the MBMS service in the UE 100 in the RRC idle mode or the Light Connected state. Further, in the typical MBMS counting procedure, transmission and reception of the counting response may cause an increase in signaling because of a plurality of UE dedicated signalings (dedicated signalings) involved therein.

In the following, a novel MBMS counting procedure that can solve such a problem will be described.

Figure 9:
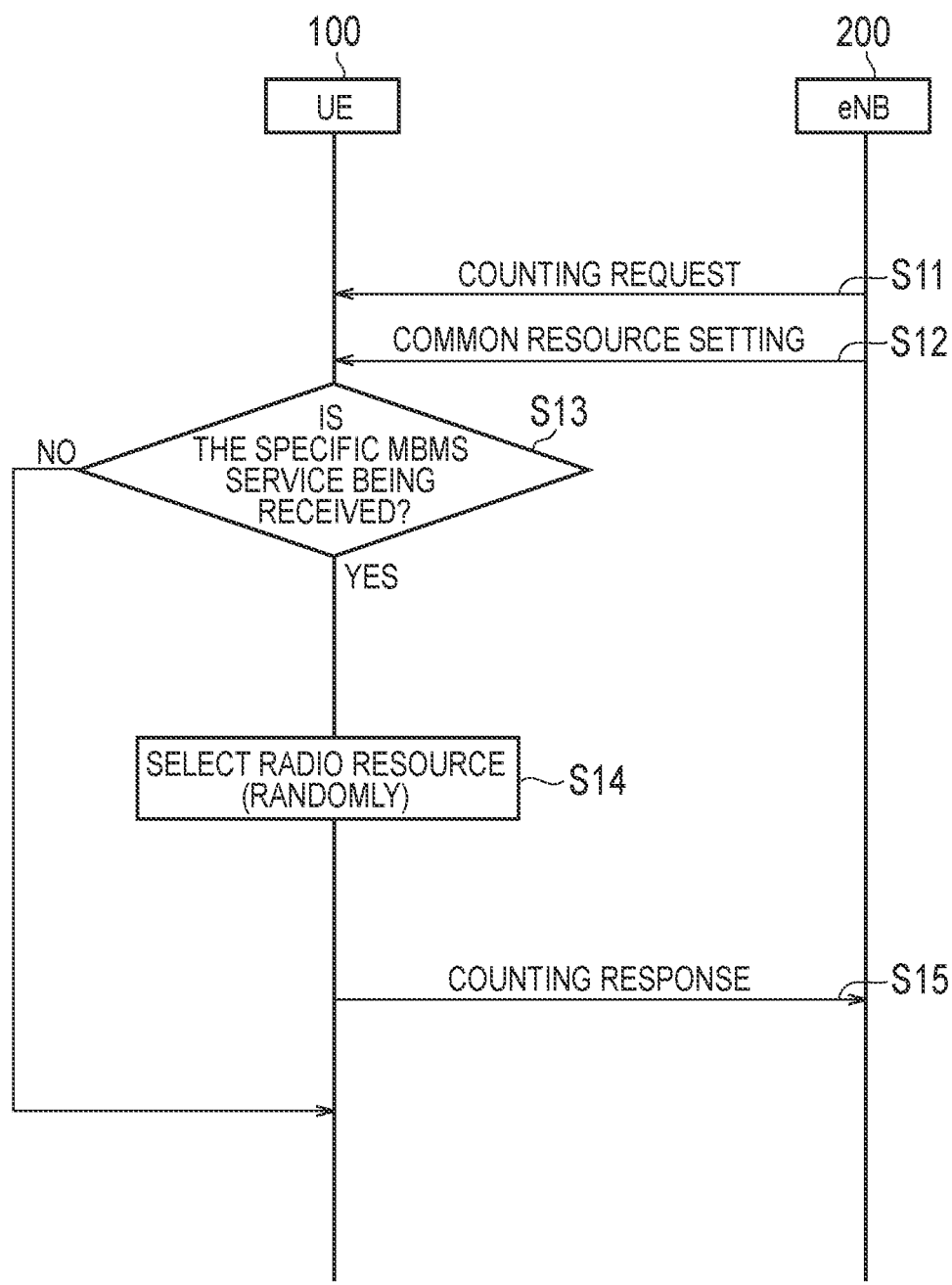
FIG. 9 is a diagram illustrating an operation example according to a first embodiment.

FIG. 9 is a diagram illustrating an operation example according to the first embodiment. In the initial state of FIG. 9, the UE 100 is in the RRC idle mode or the Light Connected state. Although only one UE 100 is illustrated in FIG. 9, actually, a plurality of UEs 100 may be located within the coverage area of the eNB 200.

As illustrated in FIG. 9, in step S11, the eNB 200 (transmitter 210) transmits the counting request for requesting a plurality of UEs 100 that are receiving the MBMS service (specific MBMS service) to be counted or interested in the reception to transmit a counting response. The counting request is transmitted by broadcast or multicast. For example, the eNB 200 (transmitter 210) transmits the counting request by using a system information block (SIB), an SC-MCCH, or an MCCH. The counting request includes a list of service identifiers (TMGI) of the MBMS service to be counted. The counting request may include information indicating that the UE 100 in the RRC idle mode or the Light Connected state is targeted.

In step S12, the eNB 200 (transmitter 210) transmits a common resource setting that indicates a common resource pool to be commonly used for transmitting the counting response by a plurality of UEs 100. The common resource setting is transmitted by broadcast or multicast. For example, the eNB 200 (transmitter 210) transmits the common resource setting by using the SIB, the SC-MCCH, or the MCCH. The common resource setting includes a time resource parameter and a frequency resource parameter which indicate the common resource pool. The common resource setting may further include a power control parameter for controlling the transmission power for the counting response. The time resource parameter may include information indicating a system frame number (SFN), information indicating a subframe (bitmap), and the like. The frequency resource parameter may include information indicating a start point or an end point of a resource block, information indicating a range (the number of resource blocks) of consecutive resource blocks, and the like. The common resource setting may include a period (or start time/end time) during which the common resource pool is provided. That period may be defined as seconds, and may be defined as a frame number (SFN, subframe, etc.). That period may be a predetermined value (for example, 10-subframe period, etc.). If that period is provided, the UE 100 transmits the counting response within the period. In other words, the UE 100 does not transmit the counting response after the lapse of the period.

Step S12 may be performed before step S11 or may be performed after step S13. Alternatively, step S12 may be performed simultaneously with step S11. In this case, the counting request and the common resource setting may be included in a single message.

The UE 100 (receiver 110) receives the counting request and the common resource setting.

In step S13, in response to receiving the counting request, the UE 100 (controller 130) determines whether the UE 100 is receiving the MBMS service to be counted or interested in the reception. Here, explanation will be made assuming that the UE 100 is receiving the MBMS service to be counted or interested in the reception.

In step S14, the UE 100 (controller 130) randomly selects a subset of radio resources (time and frequency resources) included in the common resource pool in response to the UE 100 being receiving the MBMS service to be counted or interested in the reception.

In step S15, the UE 100 (transmitter 120) transmits the counting response to the eNB 200 by using the selected subset of radio resources (that is, the PUSCH resource). The counting response includes information indicating the MBMS service that the UE 100 is receiving or interested in the reception, among MBMS services to be counted. Here, the UE 100 can transmit the counting response to the eNB 200 while maintaining the RRC idle mode or the Light Connected state.

The eNB 200 (receiver 220) receives the counting response transmitted by the plurality of UEs 100 using the radio resources included in the common resource pool. When a collision of radio resources occurs among the plurality of UEs 100, the eNB 200 (receiver 220) fails to decode the counting response transmitted using the collided radio resource. However, it should be noted that the eNB 200 does not request retransmission of the counting response. On the other hand, when no collision of radio resources occurs, the eNB 200 (receiver 220) successfully decodes the counting response transmitted using the radio resource in which the collision has not occurred.

Based on the counting response, the eNB 200 (controller 230) counts the number of UEs 100 that are receiving the MBMS service to be counted or that are interested in the reception, and reports the count result to the MCE 11. The MCE 11 (or the eNB 200) may determine whether to apply unicast transmission, MBSFN transmission, or SC-PTM transmission to each MBMS service (TMGI) based on the count result. As an example, if the number of UEs 100 that are receiving a specific MBMS service (TMGI) or interested in the reception exceeds a determination threshold, the MCE 11 (or the eNB 200) determines to use the MBSFN transmission or the SC-PTM transmission to provide the specific MBMS service. If the UEs 100 that are receiving the specific MBMS service or interested in the reception is biased toward a certain cell, the MCE 11 (or the eNB 200) may determine that the specific MBMS service is to be transmitted by the SC-PTM transmission in the cell. If the UEs 100 that are receiving the specific MBMS service or interested in the reception are scattered in a very large number of cells, the MCE 11 (or the eNB 200) may determine that the specific MBMS service is to be transmitted by the SC-PTM transmission in one or more MBSFN areas including these cells. In a state intermediate between these states, for example, in the case where a UE 100 that is receiving the specific MBMS service or interested in the reception is located across a plurality of cells or the like, the MCE 11 (or the eNB 200) may select the SC-PTM if the plurality of cells are accommodated in a single eNB, and may select the MBSFN if the plurality of cells are located across a plurality of eNBs.

According to the first embodiment, the network can roughly grasp the reception status of the MBMS service in the UE 100 in the RRC idle mode or the Light Connected state. According to the first embodiment, it is possible to reduce signaling for transmission and reception of the counting response as compared with the typical MBMS counting procedure.

Figure 10:
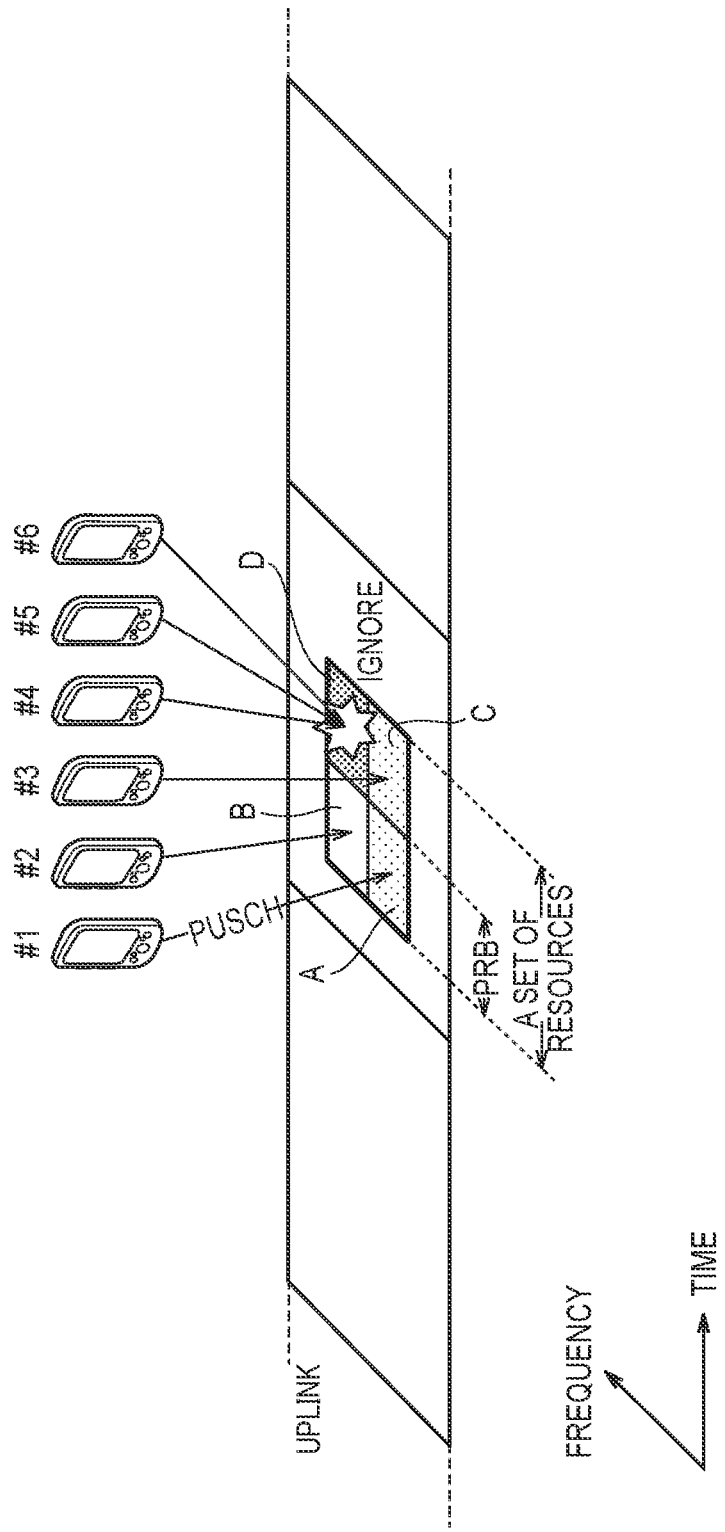
FIG. 10 is a diagram illustrating a common resource pool according to the first embodiment.

FIG. 10 is a diagram illustrating the common resource pool according to the first embodiment. In FIG. 10, one section in the time direction indicates one radio frame (or one subframe).

As illustrated in FIG. 10, the common resource pool (a set of resources) is some of the uplink radio resources of the eNB 200. As an example, the common resource pool is made up of a plurality of resource blocks (PRB: Physical Resource Block). Based on the counting request and the common resource setting received from the eNB 200, UEs #1 to #6 transmit the counting response to the eNB 200 by using the resource blocks included in the common resource pool. The resource blocks are randomly selected.

In the example of FIG. 10, UE #1 selects resource block A, UE #2 selects resource block B, UE #3 selects resource block C, and UEs #4 to #6 select resource block D. That is, a collision of resource blocks occurs for UEs #4 to #6. The eNB 200 fails to decode the counting response transmitted by using resource block D in which the collision has occurred. On the other hand, since no collision occurs in resource blocks A, B, and C, the eNB 200 successfully decodes the respective counting responses of UEs #1 to #3.

The number of resource blocks used for transmitting the counting response is not limited to one, and may be two or more. The number of resource blocks used for transmitting the counting response may be set by the eNB 200 as one of the parameters of the common resource setting.

The eNB 200 or the MCE 11 may determine the resource amount of the common resource pool (that is, the number of resource blocks of the common resource pool). When the MCE 11 determines the resource amount of the common resource pool, the MCE 11 notifies the eNB 200 of the determined common resource pool. The eNB 200 transmits the common resource setting indicating the determined common resource pool.

The eNB 200 or the MCE 11 may determine the resource amount of the common resource pool in proportion to the determination threshold for determining whether to use the MBSFN or the SC-PTM. As an example, only when the number of UEs that are interested in a certain MBMS service becomes large, the resource amount of the common resource pool is increased under the premise that the SC-PTM transmission of the MBMS service is performed. This makes it possible to contribute to avoiding collision in the common resource pool.

When the number of UEs in the RRC idle mode and/or the number of UEs in the Light Connected state is known, the eNB 200 or the MCE 11 may determine the resource amount of the common resource pool in proportion to the number of UEs. As an example, when the number of UEs in the RRC idle mode and/or the number of UEs in the Light Connected state is large, the resource amount of the common resource pool is increased.

Second Embodiment

A second embodiment will be described with a focus on a difference from the first embodiment. The second embodiment is an embodiment that makes it possible to lower the possibility of occurrence of collision in the common resource pool on the premise of the operation according to the first embodiment.

As an example, the UE 100 (controller 130) acquires a random number generated by itself or its own unique identifier. The unique identifier may be an IMSI (International Mobile Subscriber Identity). The unique identifier may be an S-TMSI (SAE-Temporary Mobile Subscriber Identity) or may be a telephone number. The unique identifier may be an identifier assigned to the UE 100 by the eNB 200. Such an identifier may be a recovery identifier (Resume ID), or may be an identifier (for example, a cell ID+C-RNTI etc.) given from the eNB when making a transition to Light Connection. The UE 100 (controller 130) determines whether or not transmission of the counting response is permitted based on the random number or the unique identifier.

As another example, the UE 100 (controller 130) determines a transmission timing of the counting response based on the random number or the unique identifier. The transmission timing may be defined by a system frame number (SFN) for identifying a radio frame. The transmission timing may be defined by a subframe number for identifying a subframe.

The UE 100 (receiver 110) may receive a predetermined value transmitted from the network (eNB 200). The predetermined value may be a threshold value or a variable for determining whether or not the random number or the unique identifier meets a predetermined condition. The predetermined value may be transmitted from the eNB 200 by dedicated signaling, multicast signaling (MCCH/SC-MCCH), or broadcast signaling (SIB). The UE 100 (controller 130) may determine whether or not the transmission of the counting response is permitted, based on the random number or the unique identifier and also based on the predetermined value. The UE 100 (controller 130) may determine the transmission timing of the counting response based on the random number or the unique identifier and also based on the predetermined value.

Figure 11:
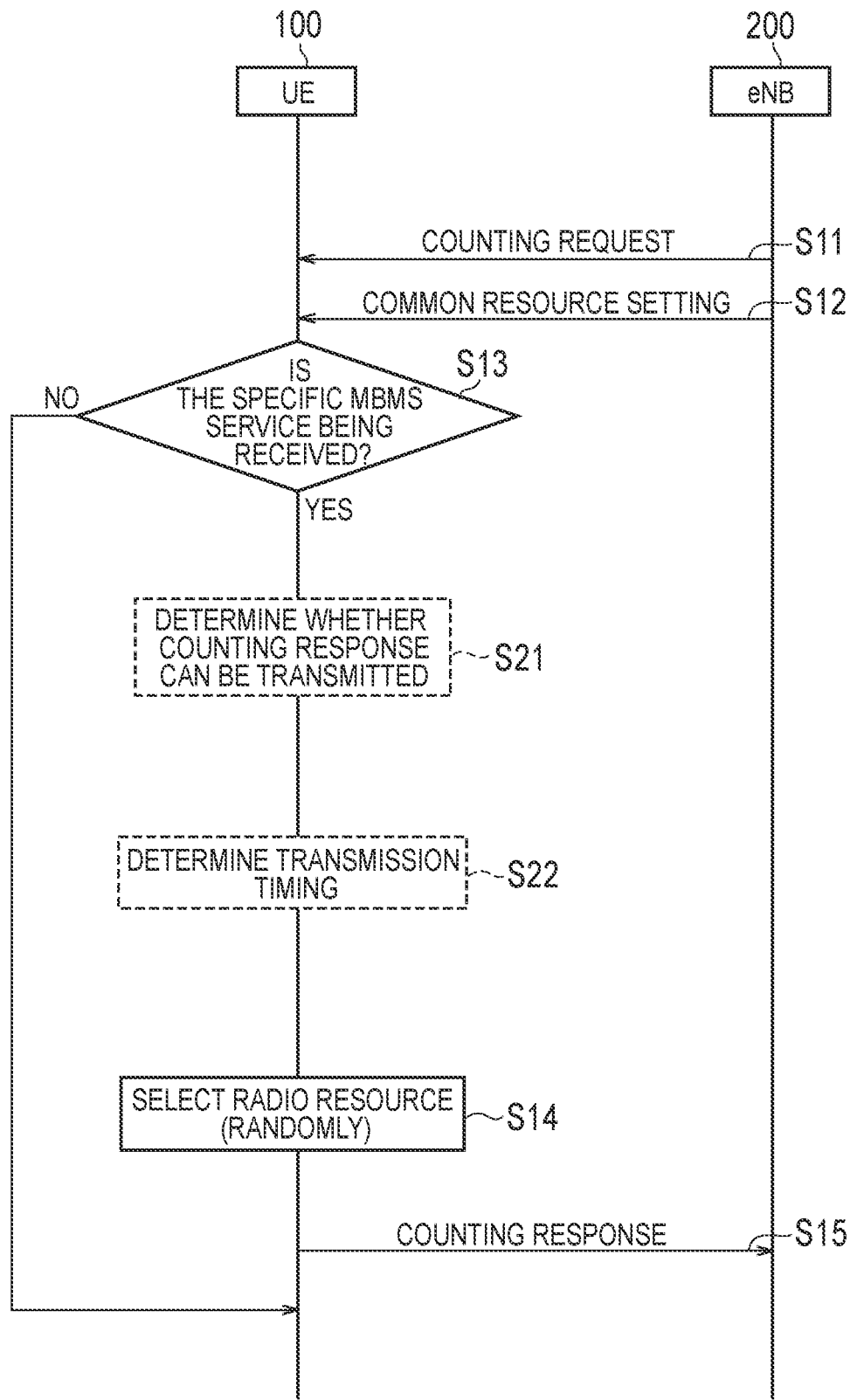
FIG. 11 is a diagram illustrating an operation example according to a second embodiment.

FIG. 11 is a diagram illustrating an operation example according to the second embodiment. Here, differences from the first embodiment will be mainly described and a redundant description will be omitted. In FIG. 11, steps S13, S21, S22, and S14 may be performed in this order, and the order of steps S13, S21, S22, and S14 may be changed. Only one of step S21 and step S22 may be performed.

As illustrated in FIG. 11, steps S11 to S13 are the same as those in the first embodiment.

In step S21, the UE 100 (controller 130) determines whether or not transmission of its own counting response is permitted.

As an example, the UE 100 (controller 130) generates a random number (in a range of 0 to 1), and compares the threshold value (in a range of 0 to 1) notified from the eNB 200 with the random number. If the random number meets the threshold condition, the UE 100 (controller 130) determines that transmission of the counting response is permitted, and enables the transmission function of the counting response. "The random number meets the threshold condition" may be that the random number exceeds the threshold condition, or may be that the random number is lower than the threshold condition. If the random number does not meet the threshold condition, the UE 100 (controller 130) determines that transmission of the counting response is not permitted, and disables the transmission function of the counting response.

As another example, the UE 100 (controller 130) acquires its own IMSI and determines whether or not the IMSI meets the condition defined by the variable ("N", "T") notified from the eNB 200. As such a condition, the conditional expression "(IMSI)mod(N)=(T)" may be used. In the conditional expression, instead of using the IMSI itself, a value based on the IMSI (for example, IMSI mod 1024) may be used. In the conditional expression, an inequality ($>$, $<$, $\leq$, or $\geq$ may be used instead of using an equation. If the IMSI meets the threshold condition, the UE 100 (controller 130) determines that transmission of the counting response is permitted, and enables the transmission function of the counting response. If the IMSI does not meet the threshold condition, the UE 100 (controller 130) determines that transmission of the counting response is not permitted, and disables the transmission function of the counting response.

Figure 12:
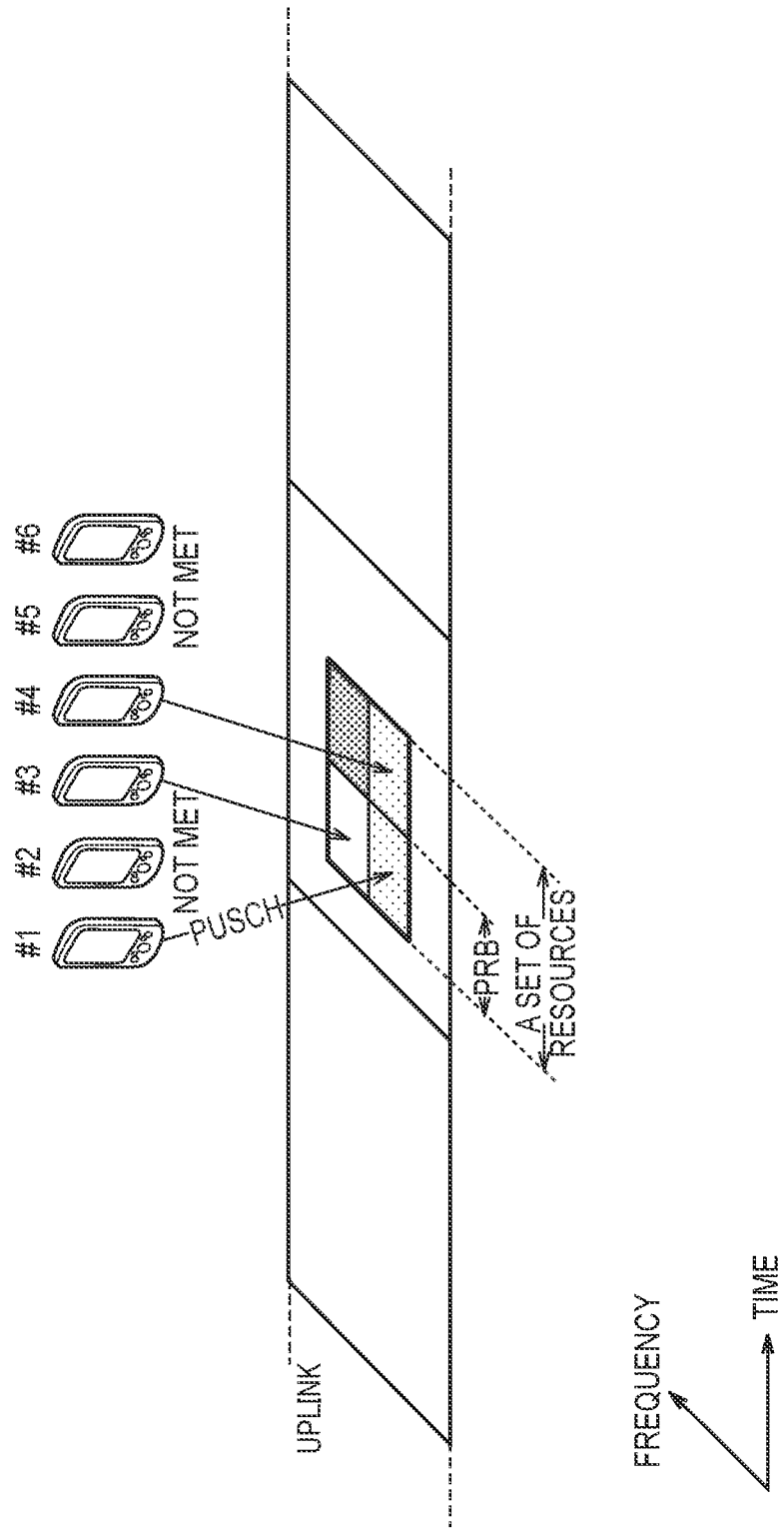
FIG. 12 is a diagram illustrating a determination whether a counting response can be transmitted according to the second embodiment.

FIG. 12 is a diagram illustrating a determination whether the counting response can be transmitted. Each of UEs #1 to #6 determines whether or not transmission of its own counting response is permitted. In the example of FIG. 12, UEs #1, #3, and #4 meet the conditions, but UEs #2, #5, and #6 do not meet the conditions. In this case, UEs #1, #3, and #4 each transmit the counting response using the resource blocks in the common resource pool. In UEs #2, #5, and #6, transmission of the counting response is prohibited.

In step S22, the UE 100 (controller 130) determines a transmission timing of its own counting response. Step S22 may be performed only if the transmission of the counting response is permitted in step S21.

As an example, the UE 100 (controller 130) acquires its own IMSI and determines an SFN that meets the condition defined by the variable ("N") notified from the eNB 200 and the IMSI. As such a condition, a conditional expression of "(IMSI)mod(N)=(SFN)mod(N)" may be used. In the conditional expression, instead of using the IMSI itself, a value based on the IMSI (for example, IMSI mod 1024) may be used. The UE 100 (controller 130) determines that the counting response is to be transmitted with the SFN that meets the condition. The UE 100 (controller 130) determines not to transmit the counting response with the SFN that does not meet the condition. As another example, a random number may be used instead of the IMSI.

Figure 13:
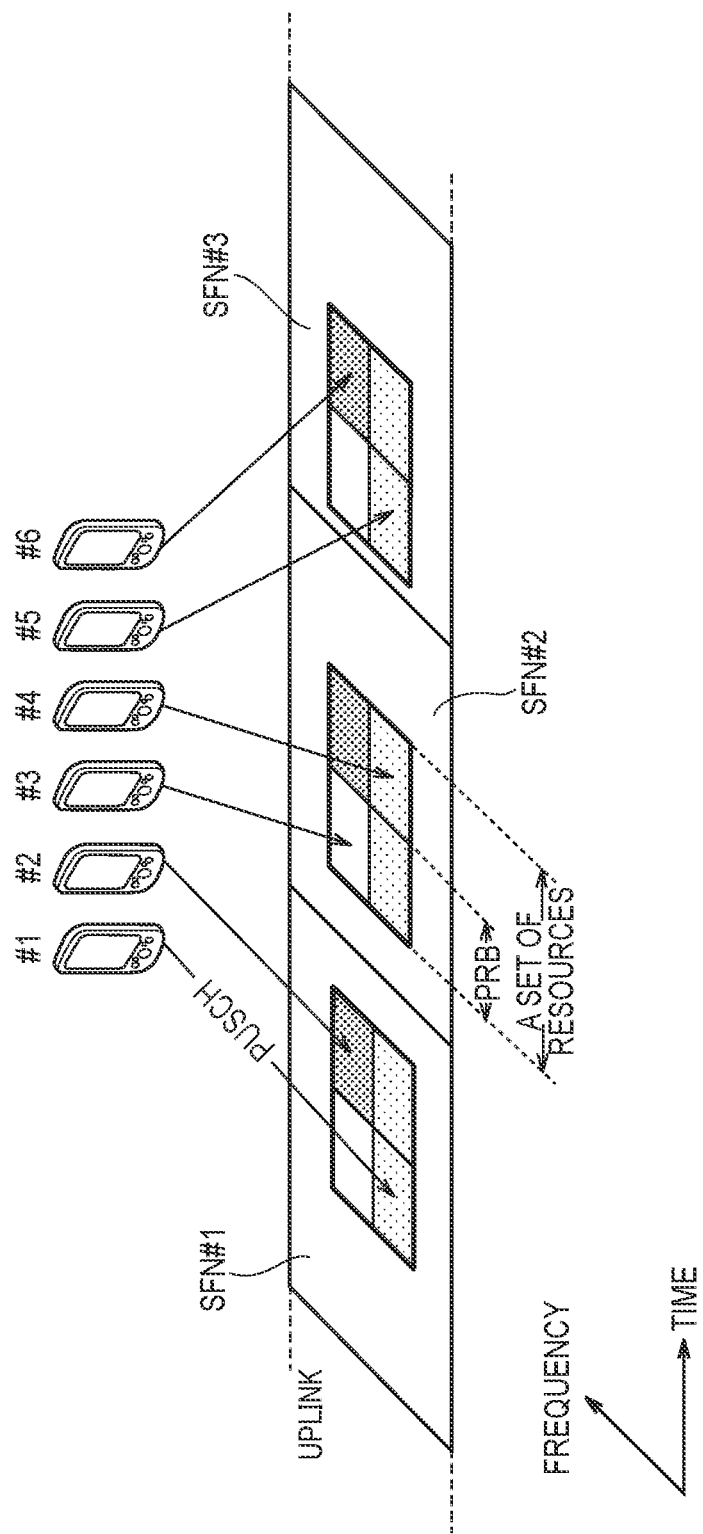
FIG. 13 is a diagram illustrating a transmission timing of the counting response according to the second embodiment.

FIG. 13 is a diagram illustrating the transmission timing of the counting response. Each of UEs #1 to #6 determines the transmission timing of the counting response of the corresponding one of UEs #1 to #6 based on the IMSI (or random number). In the example of FIG. 13, UEs #1 and #2 determine SFN #1 as the transmission timing of the counting response. UE #3 and #4 determine SFN #2 as the transmission timing of the counting response. UE #5 and #6 determine SFN #3 as the transmission timing of the counting response. In this way, the transmission timings of the counting responses of the plurality of UEs can be dispersed in the time direction.

Steps S21 and S22 may be used together. In this case, the UE 100 (controller 130) may perform determination about permission of the transmission in step S21 for each transmission timing (SFN) determined in step S22. As an example, when the UE 100 (controller 130) fails to transmit the counting response with a certain SFN and is still interested in the MBMS service to be counted, the UE 100 may retry to transmit the counting response at the next transmission opportunity (the next transmission timing). However, after transmitting the counting response, such a retry should not be performed.

Steps S14 to S15 are the same as those of the first embodiment.

Third Embodiment

A third embodiment will be described with a focus on a difference from the first and second embodiments. The third embodiment is an embodiment that associates a specific MBMS service with each of a plurality of common resource pools on the premise of the operation according to the first embodiment.

In the third embodiment, the counting request includes service identifiers (TMGIs) of the respective MBMS services. The common resource setting indicates a plurality of common resource pools that are each a common resource pool associated with the corresponding one of the plurality of MBMS services. The UE 100 (controller 130) selects a common resource pool corresponding to the service identifier of the MBMS service that the UE 100 itself is receiving or interested in the reception, from among the plurality of common resource pools. The UE 100 (transmitter 120) transmits the counting response to the network (eNB 200) by using the radio resource included in the selected common resource pool.

Associating the MBMS service with the common resource pool makes it possible to reduce the possibility of collision occurring in the common resource pool. Introduction of such a correspondence relationship makes it possible to reduce the information volume of the counting response. As an example, the counting response may be composed of a 1-bit flag. By counting up the counting response for each common resource pool, the eNB 200 grasps the number of UEs that are receiving each MBMS service or that are interested in the reception.

As an example, the UE 100 (transmitter 120) transmits, as a counting response, a common signal sequence commonly used by a plurality of UEs for transmitting the counting response. The common signal sequence may be preset in the UE 100. The common signal sequence may be set in the UE 100 by the eNB 200. The common signal sequence is a signal sequence such as a scheduling request (SR). The eNB 200 measures a reception power of the counting response (common signal sequence) for each common resource pool. Based on the reception power of each common resource pool, the eNB 200 can roughly grasp the number of UEs that are receiving the MBMS service corresponding to the common resource pool or interested in the reception. The eNB 200 may roughly grasp the number of UEs that are receiving the MBMS service or interested in the reception, from a difference between the target power and the actual received power.

As another example, the UE 100 (controller 130) acquires a random number generated by itself or its own unique identifier, and selects a signal sequence using the random number or the identifier. The UE 100 (transmitter 120) transmits, as a counting response, a signal sequence (individual signal sequence) selected using the random number or the identifier. The eNB 200 determines the number of counting responses (individual signal sequences) for each common resource pool, and thus can grasp the number of UEs that are receiving the MBMS service corresponding to the common resource pool or interested in the reception.

Each of the plurality of common resource pools may be set as a physical random access channel (PRACH) resource. In this case, a random access preamble may be used as the counting response. The PRACH resource used as the common resource pool is set as a PRACH resource different from the normal PRACH resource in which the resource position is determined.

Figure 14:
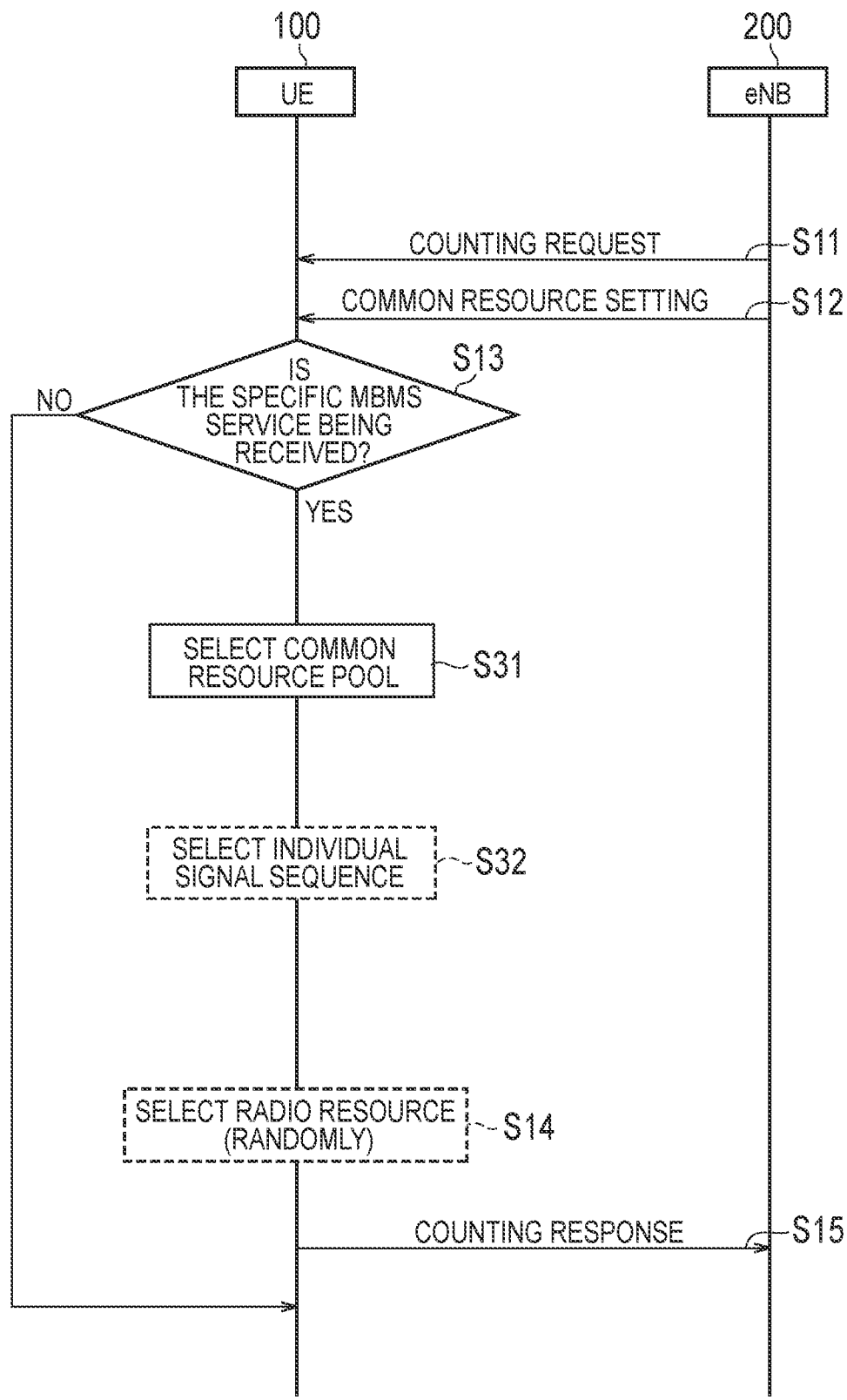
FIG. 14 is a diagram illustrating an operation example according to a third embodiment.

FIG. 14 is a diagram illustrating an operation example according to the third embodiment. Here, differences from the first embodiment will be mainly described and a redundant description will be omitted. In FIG. 14, steps S13, S31, S32, and S14 need not be performed in this order, and the order of steps S13, S31, S32, and S14 may be changed. In the case of using the above-described common signal sequence, step S32 may be omitted. In the case of using the above-described individual signal sequence, step S14 may be omitted.

As illustrated in FIG. 14, steps S11 to S13 are the same as those in the first embodiment. However, in step S11, the eNB 200 (transmitter 210) transmits a counting request including the service identifier (TMGI) of each of the plurality of MBMS services. In step S12, the eNB 200 (transmitter 210) transmits a common resource setting indicating a plurality of common resource pools corresponding to the plurality of MBMS services. In step S11 or S12 (or other signaling), the eNB 200 (transmitter 210) may transmit information (that is, mapping information) indicating the correspondence relationship between the service identifier (TMGI) and the common resource pool. Alternatively, by matching the arrangement order of the service identifiers in the counting request with the arrangement order of the common resource pools in the common resource setting, the correspondence relationship may be indicated implicitly. The correspondence relationship between the service identifier and the common resource pool is a one-to-one relationship. However, it may be a one-to-many relationship.

In the case of using the common signal sequence described above, the eNB 200 may set parameters indicating the common signal sequence in the UE 100. The eNB 200 may set a transmission power parameter (for example, a target reception power in the eNB 200) used for open-loop transmission power control or the like of the common signal sequence in the UE 100. In the case of using the individual signal sequence described above, the eNB 200 may set the individual signal sequence and/or parameters for determining its transmission power in the UE 100. These parameters may be transmitted from the eNB 200 by dedicated signaling, multicast signaling (MCCH/SC-MCCH), or broadcast signaling (SIB).

In step S31, the UE 100 (controller 130) selects a common resource pool corresponding to the service identifier (TMGI) of the MBMS service that the UE 100 is receiving or interested in the reception, from among the plurality of common resource pools. When the UE 100 is receiving or is interested in receiving a plurality of MBMS services from among the MBMS services to be counted, the UE 100 (controller 130) may select a plurality of common resource pools corresponding to the plurality of MBMS services.

In step S32, the UE 100 (controller 130) selects an individual signal sequence (for example, a preamble sequence) by using the random number generated by the UE 100 or the unique identifier of the UE 100. The preamble sequence is determined by a base sequence and a cyclic shift amount. As an example, the UE 100 (controller 130) determines the cyclic shift amount by '(IMSI)mod(max # of "v")'. (max # of "v") is the maximum number of cyclic shift amounts (cyclic shift patterns). The UE 100 (controller 130) may determine "PRACH Config Index" by "(IMSI)mod (max # of Index)". (max # of Index) is the maximum number of "PRACH Config Index" (for example, 64). "PRACH Config Index" is a parameter related to a preamble transmission timing (SFN) and a preamble format (signal length). Rather than having all "PRACH Config Indices" as candidates, candidate(s) may be limited to one or some of "PRACH Config Indices". As an example, "PRACH Config Index" may be limited to "Any" (see Table 5.7.1-2 of TS 36.211). "Any" is a setting that allows transmission with any SFN. In this case, (max # of Index) is limited to, for example, 43. In this case, the determined PRACH Config Index is shifted (for example, when Index is 0, Index of Table 5.7.1-2 of TS 36.211 indicates 3). This control makes it possible to effectively utilize the resources allocated for signal reception. It is possible to perform counting in a shorter time.

Steps S14 to S15 are the same as those of the first embodiment. However, in step S15, the UE 100 (transmitter 120) transmits the common signal sequence or the individual signal sequence as a counting response to the network (eNB 200) by using the common resource pool selected in step S31.

FIG. 15 is a diagram illustrating a correspondence relationship between the service identifier (TMGI) and the common resource pool. As illustrated in FIG. 15, four common resource pools corresponding to TMGI #1 to TMGI #4 are set. UE #1 is receiving MBMS services of TMGI #1, #2, and #3 or interested in the reception, and transmits a counting response in each of the common resource pools corresponding to TMGI #1, #2, and #3. Other UEs similarly transmit counting responses in common resource pools corresponding to MBMS services that the other UEs are receiving or interested in the reception. The resource amount of each common resource pool may be individually set using the above-described method.

Modification of Third Embodiment

In the first to third embodiments described above, a scenario where a UE 100 in a new category exists is not considered. The UE 100 in the new category is a UE 100 whose transmission and reception bandwidth is limited only to a part of the system transmission and reception band. In this modification, a scenario is assumed in which batch delivery of firmware or the like is performed to such a UE 100 by multicast/broadcast using MBMS.

The new UE category is referred to as, for example, category M1 or NB (narrow band)-IoT category. Here, category M1 is an eMTC (enhanced Machine Type Communications) UE. Further, the NB-IoT UE is category NB1. Category M1 limits the transmission and reception bandwidth of the UE 100 to 1.08 MHz (that is, the bandwidth of six resource blocks) and supports coverage enhancement (CE: Enhanced Coverage) technique using repetitive transmission and the like. NB-IoT category further limits the transmission and reception bandwidth of the UE 100 to 180 kHz (that is, the bandwidth of one resource block) and supports the coverage enhancement technique. The repetitive transmission is a technique of repeatedly transmitting the same data using a plurality of subframes. As an example, the system bandwidth of the LTE system is 10 MHz, of which the transmission and reception bandwidth is 9 MHz (that is, the bandwidth of 50 resource blocks). On the other hand, the UE 100 of the category M1 cannot receive a normal PDCCH because it cannot receive a downlink radio signal transmitted with a wider bandwidth than six resource blocks. For this reason, MPDCCH (MTC-PDCCH) which is a PDCCH for MTC is introduced. For the same reason, NPDCCH (NB-PDCCH) which is a PDCCH for NB-IoT is introduced.

Hereinafter, the degree of coverage enhancement required for the UE 100 is referred to as "CE level". The "CE level" is related at least to the number of transmissions in the repetitive transmission (that is, repetition frequency).

In this modification, a CE level is associated with each of a plurality of common resource pools. The eNB 200 may set the correspondence relationship (mapping information) between the common resource pool and the CE level in the UE 100 by dedicated signaling, multicast signaling (MCCH/SC-MCCH), or broadcast signaling (SIB).

A service identifier (TMGI) and a CE level may be associated with each of the plurality of common resource pools. As an example, setting may be performed such that common resource pool #1 is associated with TMGI #1 and CE level #1, common resource pool #2 is associated with TMGI #1 and CE level #2, . . . . When making a counting request, the eNB 200 may notify the UE 100 of TMGIs to be counted and a pool (common resource setting) for each of the CE levels corresponding to the TMGIs. Alternatively, the eNB 200 may notify the UE 100 of a pool (common resource setting) for each of the CE levels as setting information for each TMGI by using the SC-MCCH (or SIB20).

The UE 100 acquires its own CE level. The CE level may be preset in the UE 100. Alternatively, the CE level may be variable depending on the situation of the UE 100. As an example, the UE 100 determines its own CE level depending on the result of comparison between the reception power (RSRP: Reference Signal Received Power) from the network and a threshold value. The threshold value (list) may be notified from the network to the UE 100. Each threshold value is associated with a CE level.

The UE 100 selects a common resource pool corresponding to its own CE level from the plurality of common resource pools. The UE 100 may select a plurality of common resource pools corresponding to the service identifiers (TMGIs) of MBMS services that the UE 100 is receiving or interested in the reception, and further select the common resource pool corresponding to its own CE level from among the plurality of common resource pools. The UE 100 having a predetermined CE level (for example, a level indicating that coverage enhancement is not required) or the UE 100 located in a normal coverage area does not have to transmit a counting response.

The eNB 200 counts the number of counting responses for each common resource pool or measures the reception power of the counting response. Accordingly, the eNB 200 (or the MCE 11) may estimate the number of UEs 100 for each MBMS service and for each CE level. Based on the estimation result, the eNB 200 (or the MCE 11) may determine the repetition frequency of the MBMS service. As an example, from a CE level distribution for a plurality of UEs 100 that are receiving a certain MBMS service or interested in the reception, the eNB 200 (or the MCE 11) determines, as the CE level of the MBMS service, the CE level having the largest number of UEs 100 (or the CE level having the number of UEs 100 of more than a threshold value), and transmits the MBMS service by SC-PTM with the repetition frequency or the like corresponding to the determined CE level. For a plurality of UEs 100 that are receiving a certain MBMS service or interested in the reception, the eNB 200 (or the MCE 11) may determine, as the CE level of the MBMS service, the highest CE level (for example, the CE level having the largest repetition frequency) for which a counting response is obtained.

Fourth Embodiment

A fourth embodiment will be described with a focus on a difference from the first to third embodiments. The fourth embodiment is an embodiment in which movement of the UE 100 that is receiving an MBMS service is considered.

As an example, when the UE 100 that is receiving the MBMS service by SC-PTM moves to another cell, the destination cell may not be able to provide the SC-PTM. In this case, the UE 100 may need to make a transition to the RRC connected mode in order to continuously receive the MBMS service.

As described above, when the UE 100 (transmitter 120) is in a specific state (RRC idle mode or Light Connected state), the UE 100 transmits a counting response to the network by using at least a subset of resources from the common resource pool. In the fourth embodiment, the UE 100 (transmitter 120) transmits a request message for restoration from its own specific state to the network. The request message includes information indicating that the UE 100 is receiving the MBMS service or interested in the reception. The request message is one of "RRC Connection Request message" for requesting establishment of RRC connection, "RRC Connection Resume Request message" for requesting restoration of RRC connection, and "Activation Request message for Light Connection".

The request message has a Cause field indicating the reason. The UE 100 includes, in the Cause field, information indicating the MBMS service being received or an interest in the reception. Generally, one of emergency, highPriorityAccess, mt-Access, mo-Signalling, mo-Data, delayTolerantAccess, and mo-VoiceCall is set in the Cause field. Based on the contents of the Cause field, the eNB 200 determines the priority of processing the request message.

Upon receiving the request message, the eNB 200 preferentially processes the request message in response to the request message including information indicating the MBMS service being received or an interest in the reception. In other words, the eNB 200 controls so that the UE 100 that is receiving the MBMS service or interested in the reception preferentially makes a transition to the RRC connected mode. The priority in this case can be set, for example, to an intermediate level between mo data and high priority access.

Other Embodiments

In the modification of the third embodiment, the example in which the CE level is variable depending on the situation of the UE 100 has been described. In response to its own CE level having changed or multicast reception (MBMS reception) having failed, the UE 100 may notify the eNB 200 of that. When the CE level of the UE 100 has changed or the multicast reception (MBMS reception) has failed and when the UE 100 is still interested in the multicast reception and/or when the MBMS service is in progress, the UE 100 may perform that notification. The eNB 200 may change the repetition frequency of the MBMS service or the like according to that notification.

The UE 100 may control transmission of an MBMS interest notification to the eNB 200 based on its own CE level. The MBMS Interest notification (MBMS interest indication) is an RRC message indicating that the UE 100 is receiving an MBMS service or is interested in the reception. The MBMS interest notification can include at least one of the frequency of the MBMS service that the UE 100 is receiving or interested in the reception, information indicating whether or not reception of the MBMS service takes precedence over unicast reception, and a list of service identifiers (TMGI) of the MBMS services. The UE 100 may include its own CE level in the MBMS interest notification. The UE 100 may transmit the MBMS interest notification to the network only when the UE 100 determines that coverage enhancement (CE) is required. The eNB 200 may request (or permit) the UE 100 to transmit such a special MBMS interest notification. The eNB 200 may transmit, to the UE 100, information indicating whether or not to include the CE level in the MBMS interest notification. The signaling of these eNBs 200 may be dedicated signaling, multicast signaling (MCCH/SC-MCCH), or broadcast signaling (SIB). The UE 100 transmits the MBMS interest notification to the eNB 200 according to the signaling from the eNB 200.

The MCE 11 and/or the MME 300 may perform at least part of the processing described as performed by the eNB 200. The MCE 11 may be notified of the CE level from the MME 300. That CE level may be associated with a TMGI. That CE level may be the CE level for which expansion is most needed out of the CE levels of the UE 100 that is interested in the MBMS service indicated by that TMGI (for example, the CE level having the largest repetition frequency). The MCE 11 (or the MME 300) may notify the eNB 200 (or the MCE 11) of the repetition frequency of that MBMS service in a session start request of the MBMS service.

The MBMS counting procedure according to each of the embodiments described above may be used together with a general MBMS counting procedure. As an example, the number of UEs in the RRC connected mode that are receiving a specific MBMS service or interested in the reception may be grasped by a general MBMS counting procedure, and based on that number of UEs in the RRC connected mode, the resource amount of common resource pools and the like may be determined.

The uplink transmission operation in each of the above-described embodiments may be applied to contention-based uplink data transmission. In such a modification, no counting request is used, and "counting response" is read as "uplink signal". More specifically, "counting response" may be read as "uplink data". Such a modification can be summarized as follows. A radio terminal for a mobile communication system includes a receiver configured to receive from a network a common resource setting indicating common resources to be commonly used for transmitting an uplink signal by a plurality of radio terminals, a controller configured to acquire a unique identifier of the radio terminal and determine a radio resource to be used by the radio terminal for transmitting an uplink signal from among the common resources based on the unique identifier, and a transmitter configured to transmit the uplink signal to the network by using the determined radio resource. Here, the controller may determine a time resource (for example, a subframe) that is used for transmitting the uplink signal by the radio terminal, based on the unique identifier. Based on the unique identifier, the controller may determine a frequency resource (for example, a carrier of 180 kHz (bandwidth of one resource block) in NB-IoT) used for transmitting the uplink signal by the radio terminal.

In the contention-based uplink data transmission, the UE 100 may perform contention-based UL transmission only for subframes meeting "IMSI mod x=0", for example. Here, if subframes that permit the contention-based UL transmission are sporadic (for example, if effective subframes are specified as a pattern in the UE 100), only the effective subframes may be counted up from the starting subframe number. That is, the UE 100 may regard only the sporadic effective subframes as 0, 1, 2, 3, . . . , in order from the start. The eNB 200 may notify the UE 100 of a permission identifier of contention based transmission (for example, a notification by SIB), a parameter indicating a pattern of effective subframes of contention based transmission (for example, a start subframe {start offset} or a bitmap pattern {3, 5, 7, 10, 18}) and the like by broadcast or multicast. As described above, not only the IMSI but also Resume ID, C-RNTI, and S-TMSI may be used as the unique identifier of the UE. Here, the example of dispersion of contention-based uplink data transmission in the time direction has been described, but dispersion in the frequency direction may be performed. For example, the UE 100 may perform uplink transmission only with a carrier that meets IMSI mod x=0 (that is, 180 kHz (bandwidth of one resource block) in NB-IoT).

In the contention-based uplink data transmission, different resource (subframe and/or frequency) may be allocated among a UE in the CE (Enhanced Coverage) and a UE in the NC (Normal Coverage). (See the modification of the third embodiment.) The UE 100 may determine whether or not it is in the CE depending on whether or not a measured RSRP exceeds a certain threshold value. The UE 100 may determine whether or not the number of repeated transmissions exceeds a certain threshold value. These threshold values may be notified from the eNB 200 to the UE 100 by broadcast or multicast.

In the contention-based uplink data transmission, the UE 100 may be allocated a different resource for each transmission MCS or for each number of repeated transmissions. When the UE 100 determines the transmission resource according to the transmission MCS and performs the uplink transmission, the eNB 200 may change the decoding method (MCS) according to the reception resource.

Each of the above-described embodiments may be implemented independently; two or more embodiments may be combined and implemented. For example, a part of the processing according to one embodiment may be added to another embodiment. Alternatively, the part of the processing according to one embodiment may be replaced by a part of the configuration of another embodiment.

In each embodiment described above, the LTE system is exemplified as the mobile communication system. However, the present disclosure is not limited to the LTE system. The present disclosure may be applied to a mobile communication system other than the LTE system.

The present application claims the priority of U.S. Provisional Application No. 62/381,140 (filed on Aug. 30, 2016), and the entire content thereof is incorporated herein.

The invention claimed is:

1. A radio terminal for a mobile communication system, comprising:
    a receiver configured to receive a counting request, the counting request requesting transmission of a counting response from a plurality of radio terminals that are receiving a specific MBMS service or interested in the reception of the specific MBMS service, and a common resource setting from a network, the common resource setting indicating a common resource pool to be commonly used by the plurality of radio terminals for the transmission of the counting response;
    a controller configured to determine whether or not the radio terminal is receiving the specific MBMS service or interested in the reception thereof in response to receiving the counting request; and
    a transmitter configured to transmit the counting response to the network by using a radio resource included in the common resource pool in response to the determination that the radio terminal is receiving the specific MBMS service or interested in the reception thereof wherein
    the counting request includes a service identifier for each of a plurality of MBMS services,
    the common resource setting indicates a plurality of common resource pools that are each a common resource pool associated with a corresponding one of the plurality of MBMS services,
    the controller is configured to select one of the plurality of common resource pools that corresponds to the service identifier of the one of the plurality of MBMS services that the radio terminal is receiving or interested in the reception thereof, from among the plurality of common resource pools, and
    the transmitter is configured to transmit the counting response to the network by using a radio resource included in the selected common resource pool.

2. The radio terminal according to claim 1, wherein the controller is configured to randomly select a subset of radio resources from the common resource pool, and the transmitter is configured to transmit the counting response to the network by using the selected subset of radio resources.

3. The radio terminal according to claim 1, wherein the controller is further configured to
    acquire a random number generated by the radio terminal or a unique identifier of the radio terminal, and
    determine whether or not transmission of the counting response is permitted based on the random number or the unique identifier.

4. The radio terminal according to claim 3, wherein the receiver is configured to further receive a predetermined value transmitted from the network, and
    the controller is configured to determine whether or not transmission of the counting response is permitted based on the random number or the unique identifier and based on the predetermined value.

5. The radio terminal according to claim 1, wherein the controller is configured to acquire a random number generated by the radio terminal or a unique identifier of the radio terminal, and
    the controller is configured to determine a transmission timing of the counting response based on the random number or the unique identifier.

6. The radio terminal according to claim 5, wherein the receiver is configured to further receive a predetermined value transmitted from the network, and the controller is configured to determine the transmission timing of the counting response based on the random number or the unique identifier and based on the predetermined value.

7. The radio terminal according to claim 1, wherein the transmitter is configured to transmit, as the counting response, a common signal sequence commonly used by the plurality of radio terminals for the transmission of the counting response to the network.

8. The radio terminal according to claim 1, wherein the controller is configured to acquire a random number generated by the radio terminal or a unique identifier of the radio terminal, and the transmitter is configured to transmit to the network a signal sequence, the signal sequence selected by using the random number or the unique identifier, as the counting response.

9. The radio terminal according to claim 1, wherein the transmitter is configured to transmit the counting response to the network by using at least a subset of resources from the common resource pool when the radio terminal is in a state in which signaling is suppressed between the radio terminal and the network.

10. The radio terminal according to claim 1, wherein the transmitter is configured to transmit, to the network, a request message for the radio terminal to restore from a state in which signaling is suppressed between the radio terminal and the network, and the request message includes information indicating that the radio terminal is receiving an MBMS service or interested in the reception thereof.

11. A base station for a mobile communication system, comprising:

a transmitter configured to transmit a counting request, the counting request requesting transmission of a counting response from a plurality of radio terminals that are receiving a specific MBMS service or interested in the reception of the specific MBMS service, and a common resource setting, the common resource setting indicating a common resource pool to be commonly used by the plurality of radio terminals for the transmission of the counting response; and a receiver configured to receive the counting response transmitted by the plurality of radio terminals by using a radio resource included in the common resource pool, wherein the counting request includes a service identifier for each of a plurality of MBMS services, the common resource setting indicates a plurality of common resource pools that are each a common resource pool associated with a corresponding one of the plurality of MBMS services, and the receiver is configured to receive the counting response transmitted by the plurality of radio terminals by using a radio resource included in one of the plurality of common resource pools which is selected by the plurality of radio terminals from among the plurality of common resource pools, the one of the plurality of common resource pools corresponds to the service identifier of the one of the plurality of MBMS services that the plurality of radio terminals are receiving or interested in the reception thereof.

\* \* \* \* \*